United States Patent
Uziel et al.

(10) Patent No.: US 12,207,258 B2
(45) Date of Patent: Jan. 21, 2025

(54) DYNAMIC PHYSICAL DOWNLINK SHARED CHANNEL MAPPING MODES

(71) Applicant: QUALCOMM Incorporated, San Diego, CA (US)

(72) Inventors: Lior Uziel, Hod Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/583,401

(22) Filed: Jan. 25, 2022

(65) Prior Publication Data

US 2023/0239876 A1    Jul. 27, 2023

(51) Int. Cl.
*H04W 72/12* (2023.01)
*H04W 72/20* (2023.01)
*H04W 72/23* (2023.01)

(52) U.S. Cl.
CPC ........... *H04W 72/20* (2023.01); *H04W 72/23* (2023.01)

(58) Field of Classification Search
CPC ...... H04W 72/20; H04W 72/23; H04L 1/0067
See application file for complete search history.

(56) References Cited

U.S. PATENT DOCUMENTS

| | | | |
|---|---|---|---|
| 2019/0363824 A1 | 11/2019 | Sun et al. | |
| 2020/0367242 A1* | 11/2020 | Moon | H04L 5/0048 |
| 2020/0367277 A1* | 11/2020 | Hosseini | H04L 5/0053 |

OTHER PUBLICATIONS

CATT: "Details of Rate Matching for PDSCH and PUSCH", 3GPP TSG RAN WG1 Meeting 91, R1-1720210, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051369846, pp. 1-6, Sections 1 and 2.
International Search Report and Written Opinion—PCT/US2023/011081—ISA/EPO—Apr. 28, 2023 (2105922WO).
Samsung: "On Rate Matching", 3GPP TSG RAN WG1 Meeting 91, R1-1720351, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017, XP051369930, pp. 1-8, Sections 1 and 2.

(Continued)

*Primary Examiner* — John D Blanton
(74) *Attorney, Agent, or Firm* — Holland & Hart LLP

(57) ABSTRACT

Methods, systems, and devices for dynamic physical downlink shared channel (PDSCH) mapping modes are described. In some examples, a user equipment (UE) may receive a first control message identifying one or more sets of resources around which the UE may rate match for a downlink channel. In some examples, the UE may receive a second control message including an indication that the UE may perform either rate matching around at least one set of resources of the one or more sets of resources or receiving the downlink channel on the at least one set of resources. As such, the UE may receive signals on the downlink channel according to the indication received in the second control message.

28 Claims, 18 Drawing Sheets

(56) References Cited

OTHER PUBLICATIONS

Sharp: "Rate Matching Configuration/Signaling for PDSCH/PUSCH", 3GPP TSG RAN WG1 Meeting #91, R1-1720619, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370085, pp. 1-5, Sections 1 and 2.

Spreadtrum Communications: "Remaining Issues on PDSCH Rate Matching", 3GPP TSG RAN WG1 Meeting #94, R1-1808803 Remaining Issues on PDSCH Rate Matching_Final, 3rd Generation Partnership Project, Mobile Competence Centre, 650, Route Des Lucioles, F-06921 Sophia-Antipolis Cedex, F, vol. RAN WG1, No. Gothenburg, Sweden, Aug. 20, 2018-Aug. 24, 2018, Aug. 10, 2018, XP051516176, 4 Pages, Sections 1 and 2.

\* cited by examiner

DYNAMIC PHYSICAL DOWNLINK SHARED CHANNEL MAPPING MODES

FIELD OF TECHNOLOGY

The following relates to wireless communications, including dynamic physical downlink shared channel (PDSCH) mapping modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may transmit a data transmission to a UE, mapping the data transmission to specific resource elements (REs), even though one or more other signals may be transmitted on those specific REs. Mapping data transmissions around the REs of such signaling may be referred to as rate matching.

SUMMARY

The described techniques relate to improved methods, systems, devices, and apparatuses that support dynamic physical downlink shared channel (PDSCH) mapping modes. Generally, the described techniques provide for indicating whether rate matching may be used in a specific data transmission. For example, the user equipment (UE) may receive a first control message identifying one or more resources around which the UE may rate match a downlink channel. The UE may receive a second control message including an indication that the UE may perform either rate matching around at least one or more resources of the one or more sets of resources or receiving the downlink channel on the at least one set of resources. In some examples, the UE may receive signals on the downlink channel according to the indication received in the second control message.

A method for wireless communication at a UE is described. The method may include receiving a first control message identifying one or more sets of resources around which the UE is to rate match for a downlink channel, receiving a second control message including an indication that the UE is to perform one of rate matching around at least one set of resources of the one or more sets of resources or receiving the downlink channel on the at least one set of resources, and receiving signals on the downlink channel according to the indication received in the second control message.

An apparatus for wireless communication at a UE is described. The apparatus may include a processor, memory coupled with the processor, and instructions stored in the memory. The instructions may be executable by the processor to cause the apparatus to receive a first control message identifying one or more sets of resources around which the UE is to rate match for a downlink channel, receive a second control message including an indication that the UE is to perform one of rate matching around at least one set of resources of the one or more sets of resources or receiving the downlink channel on the at least one set of resources, and receive signals on the downlink channel according to the indication received in the second control message.

Another apparatus for wireless communication at a UE is described. The apparatus may include means for receiving a first control message identifying one or more sets of resources around which the UE is to rate match for a downlink channel, means for receiving a second control message including an indication that the UE is to perform one of rate matching around at least one set of resources of the one or more sets of resources or receiving the downlink channel on the at least one set of resources, and means for receiving signals on the downlink channel according to the indication received in the second control message.

A non-transitory computer-readable medium storing code for wireless communication at a UE is described. The code may include instructions executable by a processor to receive a first control message identifying one or more sets of resources around which the UE is to rate match for a downlink channel, receive a second control message including an indication that the UE is to perform one of rate matching around at least one set of resources of the one or more sets of resources or receiving the downlink channel on the at least one set of resources, and receive signals on the downlink channel according to the indication received in the second control message.

In some examples of the method, apparatuses, and non-transitory computer-readable medium described herein, receiving the signals on the downlink channel may include operations, features, means, or instructions for attempting to decode the downlink channel on resources exclusive of the at least one set of resources based on the indication of the received second control message indicating that the UE is to perform rate matching around the at least one set of resources.

In some examples of the method, apparatuses, and non-transitory computer-readable medium described herein, receiving the signals on the downlink channel may include operations, features, means, or instructions for attempting to decode the downlink channel on resources that include the at least one set of resources based on the indication of the received second control message indicating that the UE is to receive the downlink channel on the at least one set of resources.

In some examples of the method, apparatuses, and non-transitory computer-readable medium described herein, the indication includes a first indication and the method, apparatuses, and non-transitory computer-readable medium may include further operations, features, means, or instructions for receiving, in the second control message, a second indication that the UE is to perform a different one of rate matching around at least one second set of resources of the one or more sets of resources or receiving the downlink channel on the at least one second set of resources.

In some examples of the method, apparatuses, and non-transitory computer-readable medium described herein, the indication identifies that the UE is to perform rate matching around the at least one set of resources of the one or more sets of resources based on the at least one set of resources being transmitted on resources spatially related to the downlink channel and the second indication identifies that the UE is to perform receiving the downlink channel on the at least one set of resources based on the at least one second set of resources being transmitted on resources spatially separate from the downlink channel.

In some examples of the method, apparatuses, and non-transitory computer-readable medium described herein, the indication identifies that the UE is to perform rate matching around the at least one set of resources of the one or more sets of resources based on the at least one set of resources having a same quasi-co-location (QCL) relationship with a first synchronization signal block (SSB) transmitted on resources spatially related to the downlink channel and the second indication identifies that the UE is to perform receiving the downlink channel on the at least one set of resources based on the at least one second set of resources being transmitted on resources spatially separate from the downlink channel.

In some examples of the method, apparatuses, and non-transitory computer-readable medium described herein, the one or more sets of resources include a set of multiple sets of resources, and receiving the second control message may include operations, features, means, or instructions for receiving a set of multiple bits in the second control message, where each bit of the set of multiple bits corresponds to one set of resources of the set of multiple sets of resources, and each bit indicates that the UE is to perform one of rate matching around the one set of resources or receiving the downlink channel on the one set of resources.

In some examples of the method, apparatuses, and non-transitory computer-readable medium described herein, the one or more sets of resources include a set of multiple sets of resources, and receiving the second control message may include operations, features, means, or instructions for receiving a single bit in the second control message, where the single bit indicates that the UE is to perform one of rate matching around the set of multiple sets of resources or receiving the downlink channel on the set of multiple sets of resources.

In some examples of the method, apparatuses, and non-transitory computer-readable medium described herein, receiving a second control message may include operations, features, means, or instructions for receiving, in the second control message, a grant of resources for the downlink channel, the signals received on the downlink channel based on both the grant of resources and the indication received in the second control message.

In some examples of the method, apparatuses, and non-transitory computer-readable medium described herein, the one or more sets of resources include a set of resources for a channel state information reference signal (CSI-RS), a cell specific reference signal, a control resource set (CORESET), an SSB, a physical broadcast channel (PBCH), a system information block (SIB), a tracking reference signal (TRS), a positioning reference signal (PRS), or any combination thereof.

In some examples of the method, apparatuses, and non-transitory computer-readable medium described herein, the CSI-RS includes a periodic CSI-RS (P-CSI-RS), a CORESET, aperiodic CSI-RS (A-CSI-RS), a CSI-RS for mobility, a CSI-RS for interference management, or any combination thereof.

In some examples of the method, apparatuses, and non-transitory computer-readable medium described herein, receiving the first control message identifying the one or more sets of resources may include operations, features, means, or instructions for receiving, from a base station, a message indicating one or more signals transmitted by the base station to a second device and determining whether to measure the one or more signals or defer from measuring the one or more signals based on being configured to rate match.

In some examples of the method, apparatuses, and non-transitory computer-readable medium described herein, the determination may be based on an indication received from the base station, determined by the UE, or a combination thereof.

A method for wireless communication at a base station is described. The method may include transmitting, to a UE, a first control message identifying a configuration of one or more sets of resources around which the UE is to rate match for a downlink channel, transmitting a second control message including an indication that the UE is to perform one of rate matching around at least one set of resources of the one or more sets of resources or receiving the downlink channel on the at least one set of resources, and transmitting signals on the downlink channel according to the indication received in the second control message.

An apparatus for wireless communication at a base station is described. The apparatus may include a processor, memory coupled with the processor, and instructions stored in the memory. The instructions may be executable by the processor to cause the apparatus to transmit, to a UE, a first control message identifying a configuration of one or more sets of resources around which the UE is to rate match for a downlink channel, transmit a second control message including an indication that the UE is to perform one of rate matching around at least one set of resources of the one or more sets of resources or receiving the downlink channel on the at least one set of resources, and transmit signals on the downlink channel according to the indication received in the second control message.

Another apparatus for wireless communication at a base station is described. The apparatus may include means for transmitting, to a UE, a first control message identifying a configuration of one or more sets of resources around which the UE is to rate match for a downlink channel, means for transmitting a second control message including an indication that the UE is to perform one of rate matching around at least one set of resources of the one or more sets of resources or receiving the downlink channel on the at least one set of resources, and means for transmitting signals on the downlink channel according to the indication received in the second control message.

A non-transitory computer-readable medium storing code for wireless communication at a base station is described. The code may include instructions executable by a processor to transmit, to a UE, a first control message identifying a configuration of one or more sets of resources around which the UE is to rate match for a downlink channel, transmit a second control message including an indication that the UE is to perform one of rate matching around at least one set of resources of the one or more sets of resources or receiving the downlink channel on the at least one set of resources, and transmit signals on the downlink channel according to the indication received in the second control message.

In some examples of the method, apparatuses, and non-transitory computer-readable medium described herein, transmitting the signals on the downlink channel may include operations, features, means, or instructions for transmitting the downlink channel on resources exclusive of the at least one set of resources based on the indication of the received second control message indicating that the UE is to perform rate matching around the at least one set of resources.

In some examples of the method, apparatuses, and non-transitory computer-readable medium described herein, transmitting the signals on the downlink channel may include operations, features, means, or instructions for transmitting the downlink channel on resources that include the at least one set of resources based on the indication of the received second control message indicating that the UE is to receive the downlink channel on the at least one set of resources.

In some examples of the method, apparatuses, and non-transitory computer-readable medium described herein, the indication includes a first indication and the method, apparatuses, and non-transitory computer-readable medium may include further operations, features, means, or instructions for transmitting, in the second control message, a second indication that the UE is to perform a different one of rate matching around at least one second set of resources of the one or more sets of resources or receiving the downlink channel on the at least one second set of resources.

In some examples of the method, apparatuses, and non-transitory computer-readable medium described herein, the indication identifies that the UE is to perform rate matching around the at least one set of resources of the one or more sets of resources based on the at least one set of resources being transmitted on resources spatially related to the downlink channel and the second indication identifies that the UE is to perform receiving the downlink channel on the at least one set of resources based on the at least one second set of resources being transmitted on resources spatially separate from the downlink channel.

In some examples of the method, apparatuses, and non-transitory computer-readable medium described herein, the indication identifies that the UE is to perform rate matching around the at least one set of resources of the one or more sets of resources based on the at least one set of resources having a same QCL relationship with a first SSB transmitted on resources spatially related to the downlink channel and the second indication identifies that the UE is to perform receiving the downlink channel on the at least one set of resources based on the at least one second set of resources being transmitted on resources spatially separate from the downlink channel.

In some examples of the method, apparatuses, and non-transitory computer-readable medium described herein, the one or more sets of resources include a set of multiple sets of resources, and transmitting the second control message may include operations, features, means, or instructions for transmitting a set of multiple bits in the second control message, where each bit of the set of multiple bits corresponds to one set of resources of the set of multiple sets of resources, and each bit indicates that the UE is to perform one of rate matching around the one set of resources or receiving the downlink channel on the one set of resources.

In some examples of the method, apparatuses, and non-transitory computer-readable medium described herein, the one or more sets of resources include a set of multiple sets of resources, and transmitting the second control message may include operations, features, means, or instructions for transmitting a single bit in the second control message, where the single bit indicates that the UE is to perform one of rate matching around the set of multiple sets of resources or receiving the downlink channel on the set of multiple sets of resources.

In some examples of the method, apparatuses, and non-transitory computer-readable medium described herein, transmitting a second control message may include operations, features, means, or instructions for transmitting, in the second control message, a grant of resources for the downlink channel, the signals received on the downlink channel based on both the grant of resources and the indication received in the second control message.

In some examples of the method, apparatuses, and non-transitory computer-readable medium described herein, the one or more sets of resources include a set of resources for a CSI-RS, a cell specific reference signal, a CORESET, an SSB, a PBCH, an SIB, a TRS, a PRS, or any combination thereof.

In some examples of the method, apparatuses, and non-transitory computer-readable medium described herein, the CSI-RS includes a P-CSI-RS, an A-CSI-RS, a CSI-RS for mobility, a CSI-RS for interference management, or any combination thereof.

DETAILED DESCRIPTION

Figure 1:
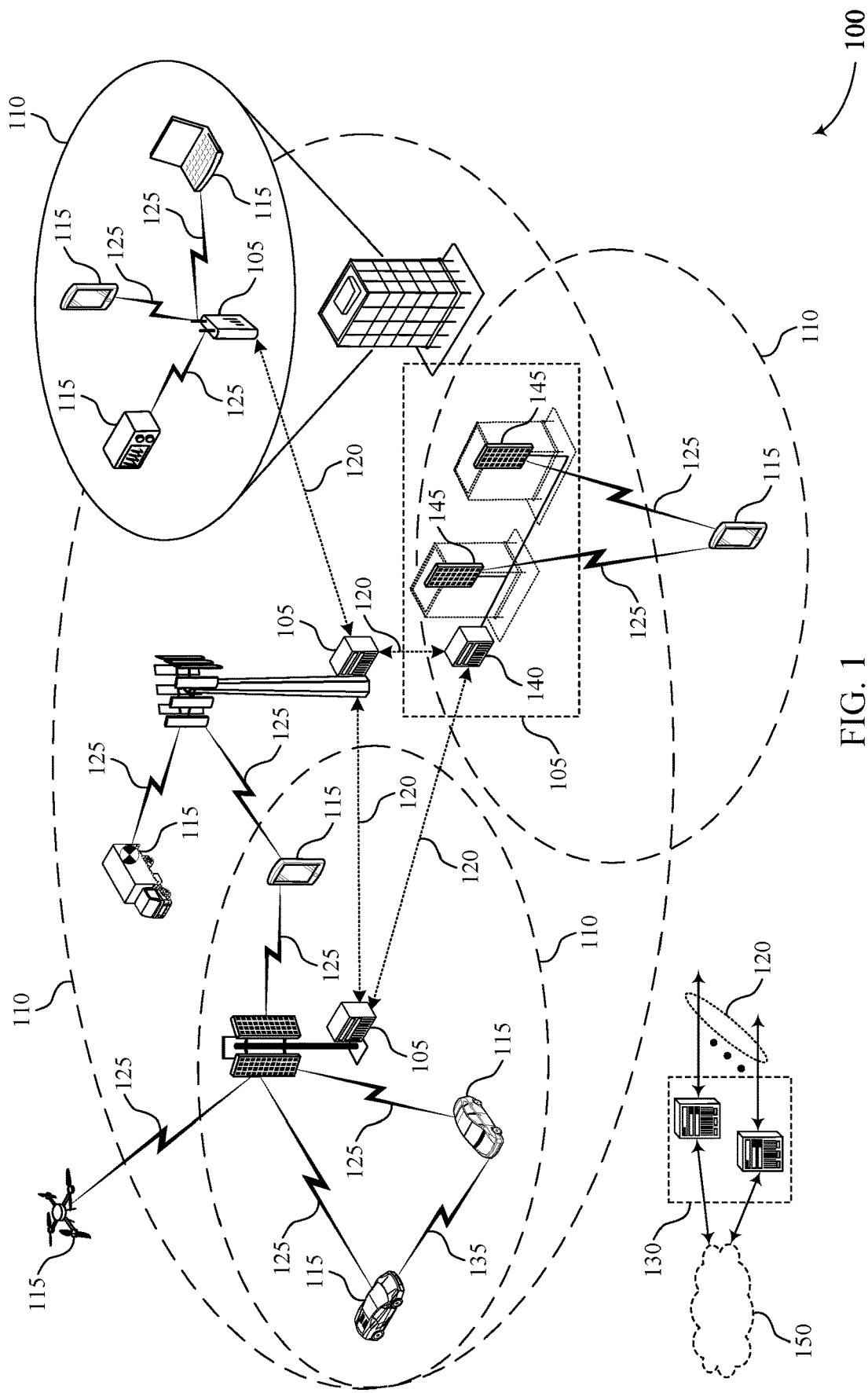
FIGS. 1 and 2 illustrate examples of wireless communications systems that support dynamic physical downlink shared channel (PDSCH) mapping modes in accordance with aspects of the present disclosure.

In some cases, the base station may transmit a data transmission to a user equipment (UE) in accordance with a PDSCH transmission flow. That is, after scrambling and modulating data transmissions, the base station may map the data transmissions to one or more layers and may map the data transmissions to one or more logical resource blocks. In some cases, the base station may map data transmissions to specific resource elements (REs), even though one or more other signals may be transmitted on those specific REs. Mapping data transmissions around the REs of such signaling may be equivalently referred to as "rate matching." For example, the base station may transmit data transmissions on the same REs that the base station transmits reference signals (e.g., channel state information references signals (CSI-RS) (including aperiodic CSI-RS (A-CSI-RS), periodic CSI-RS (P-CSI-RS), or semi-persistently configured CSI-RS (SP-CSI-RS), any of which may be non-zero-power (NZP) or zero-power (ZP) CSI-RS (e.g., including tracking reference signal (TRS)), CSI-RS for mobility, CSI for interference management (CSI-IM)), positioning reference signals (PRS), control resource sets (CORESETs), cell specific reference signals (CRS), synchronization signal blocks (SSBs), physical downlink control channels (PDCCHs), as well as other signals and channels.

Some wireless communications systems may lack support to revert, or otherwise ignore, rate matching. In cases where the base station rate matches data transmissions around REs for other channels and signals, the base station may waste resource allocations, reducing signal throughput.

In some examples, wireless communications systems may support the use of a dynamic rate matching decision enabling a base station to dynamically indicate a rate matching configuration, to a UE, indicating whether rate matching may be used in a specific data transmission. For example, the base station may include the rate matching configuration in control information to the UE. In some examples, the control information may include a quantity of bits to select configured resources for reverting rate matching. In some examples, the control information may include more than one bit, where the quantity of bits may indicate reverting rate matching as well as a configuration of resources for reverting rate matching. For example, the control information may indicate that the UE should avoid rate matching the data transmission as well as which REs the UE should avoid rate matching around. In some examples, the control information may include a single bit, where the single bit may indicate reverting rate matching. For example, the control information may indicate that the UE should avoid rate matching the data transmission around overlapping signals (e.g., signals overlapping with the REs of the data transmission).

In some examples, transmitting control information including the dynamic rate matching indication may further enable UEs to be aware of interfering signals. In some examples, the control information may enable the UE to be aware of reference signals. For example, the UE may be aware of reference signals that may be quasi co-located (QCLed) to other signals, such as SSBs or other signals transmitted by a base station for or otherwise associated with UEs other than the UE. In some cases, for example where a UE may successfully decode or otherwise receive signals on these resources, rate matching around such interfering signals may waste communication resources at the UE. Enabling UEs to be aware of interfering signals and with the rate matching configuration, with appropriate conditions, may enable UEs to rate match, or not, around the resources of the interfering signals in appropriate scenarios, and may increase communications performance and resource utilization.

Aspects of the disclosure are initially described in the context of wireless communications systems. Aspects of the disclosure are then described in the context of a mapping configuration and a process flow. Aspects of the disclosure are further illustrated by and described with reference to apparatus diagrams, system diagrams, and flowcharts that relate to dynamic PDSCH mapping modes.

FIG. 1 illustrates an example of a wireless communications system 100 that supports dynamic PDSCH mapping modes in accordance with aspects of the present disclosure.

The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., CRS, a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a base station 105 may dynamically indicate a rate matching configuration, to a UE 115, indicating whether rate matching may be used with a data transmission (e.g., for a PDSCH). For example, the base station 105 may include the rate matching configuration in a control message to the UE 115. In some examples, the control message may include a quantity of bits to select configured resources (e.g., CSI-RSs, CRS, CORESETS) for reverting rate matching (e.g., similar to bitmap patterns for rate matching). In some examples, the control message may include more than one bit (e.g., two bits), where the quantity of bits may indicate reverting rate matching as well as a configuration of resources for reverting rate matching. In some examples, the control message may include a single bit, where the single bit may indicate reverting rate matching. In some examples, transmitting the control message including the rate matching configuration may further enable UEs 115 to be aware of interfering signals. Additionally, the control message may enable the UE 115 to be aware of reference signals that may be QCLed to SSBs associated with another UE 115, as rate matching may waste communication resources at the UE 115, for example, when the resources (e.g., time and frequency resources) that are rate matched around do not carry signaling or carry signaling that does not interfere with the ability of UE 115 to receive different signals on the same resources (e.g., the same time and frequency resources). Enabling UEs 115 to be aware of other signals and with the rate matching configuration, with appropriate conditions, may enable UEs 115 to rate match with the interfering signals when rate matching may be beneficial.

Figure 2:
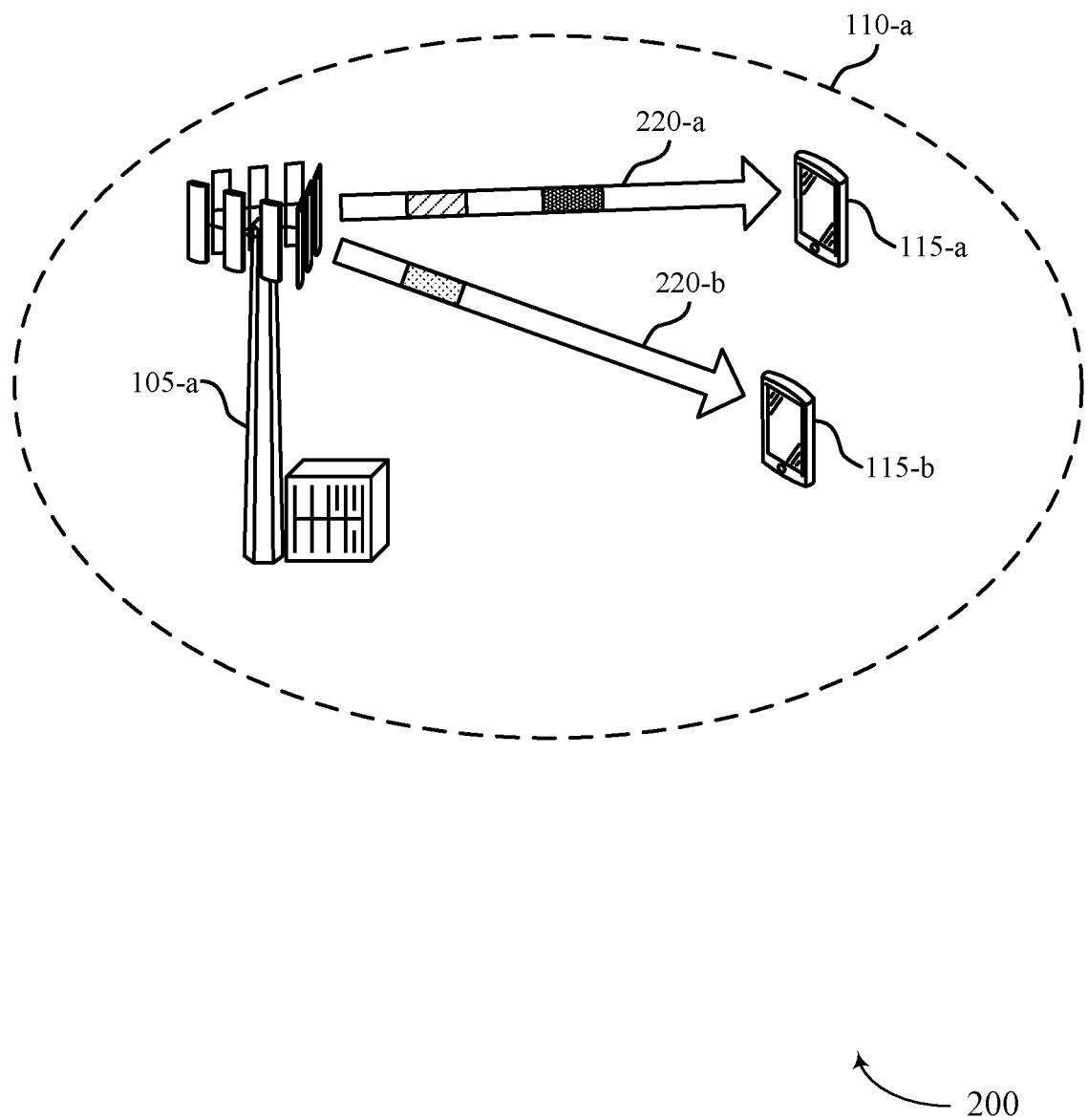

FIG. 2 illustrates an example of a wireless communications system 200 that supports dynamic PDSCH mapping modes in accordance with aspects of the present disclosure. The wireless communications system 200 may implement or be implemented by aspects of the wireless communications system 100. For example, the wireless communications system 200 may include a base station 105-a, a UE 115-a, and a UE 115-b which may be examples of corresponding devices described with reference to FIG. 1. The base station 105-a may communicate with the UE 115-a and the UE 115-b in a geographic coverage area 110-a, which may be an example of a geographic coverage area 110 described with reference to FIG. 1. In some examples, the base station 105-a may transmit control information 205 (e.g., a downlink control information (DCI) message) including a dynamic rate matching indication, where the UE 115-a may receive the control information 205 and may identify a rate matching configuration for receiving data transmission 210-a.

In some cases, the base station 105-a may transmit the data transmission 210-a to UE 115-a using communication link 220-a and the base station may transmit a data transmission 210-b to UE 115-b using communication link 220-b. The base station 105-a may transmit the data transmissions 210 in accordance with a PDSCH transmission flow. That is, after scrambling and modulating data transmissions 210, the base station 105-a may map the data transmissions 210 (e.g., PDSCH) to one or more layers (e.g., logical layers, protocol layers) and one or more antenna ports. Additionally, the base station 105-a may map the data transmissions 210 to one or more virtual resource blocks (VRBs) (e.g., logical resource blocks). For example, the base station 105-a may map modulated PDSCH symbols to the REs of a VRB. In some cases, the base station 105-a may refrain from mapping data transmissions 210 to specific REs, leaving gaps in a VRB which may be set aside for, filled by, or otherwise occupied by other signals. For example, the base station 105-a may refrain from mapping data transmissions 210 to a first pattern of REs within a VRB, where the first pattern of REs may be associated with specific signals and channels, such as SSBs, PDCCH, aperiodic, periodic, or semi-periodic NZP-CSI-RS or ZP-CSI-RS (e.g., including TRS), CORESETs, CRS, among other signals and channels (e.g., which may be periodic or semi-periodic). Mapping data transmissions 210, which may also be other transmissions carried on a PDSCH as described herein, for example control or managements signals on a PDSCH, around the REs of such signaling may be equivalently referred to as "rate matching." In some cases, the base station 105-a may map data transmissions 210 to specific REs, even though one or more other signals may be transmitted on those specific REs. For example, the base station 105-a may transmit data transmissions 210 on the same REs that the base station 105-a uses to transmit CSI-RS (e.g., A-CSI-RS, CSI-RS for mobility, CSI-IM), PRS, as well as other signals and channels, for example, signals and channels unconfigured from a UE 115 point-of-view such as CSI-RS QCLed to an SSB of a different sector (e.g., different than a sector with the UE 115), DCIs scheduled to other UEs 115, LTE signals, among other signals and channels. In other words, the base station 105-a may refrain from rate matching data transmissions 210 with specific signals and channels.

Some wireless communications systems may support one or more tools to introduce, or otherwise support, rate matching. In cases where the base station 105-a refrains from rate matching data transmissions 210 around REs for other channels and signals, collisions may occur between the data transmissions 210 and the other channels and signals. In other words, transmitting the data transmissions 210 and the other channels and signals using the same REs may introduce interference to the data transmissions 210, the other channels and signals, or both. In some cases, the wireless communications system 200 may support tools to rate match data transmissions 210 around signal and channel structures similar to the structures of the other channels and signals (e.g., interfering with the data transmissions 210). In some examples, the base station 105-a may transmit ZP-CSI-RSs to rate match data transmissions 210 around A-CSI-RS, CSI-RS for mobility, CSI-IM, among other CSI-RS not configured to a specific UE 115 (e.g., a UE 115 QCLed to a different SSB than an SSB associated with the CSI-RS not configured to the UE 115). For example, the base station 105-a may transmit an A-CSI-RS to the UE 115-b within a same PDSCH symbol that the base station 105-a transmits the data transmission 210-a to the UE 115-a. As such, the base station 105-a may transmit ZP-CSI-RS to the UE 115-a, for example, for the UE 115-a to rate match the data transmission 210 around REs corresponding to the A-CSI-RS transmitted to the UE 115-b. In some cases, the ZP-CSI-RS may be indicated dynamically, for example, the ZP-CSI-RS may be applied in a DCI scheduling an associated data transmission 210. For example, the base station 105-a may transmit a DCI to UE 115-a, the DCI scheduling the data transmission 210-a. In such examples, the DCI may indicate the ZP-CSI-RS to support rate matching of the data transmission 210-a around the REs associated with the A-CSI-RS. In some examples, the base station may indicate one or more reserved resources to rate match data transmissions 210 around CORESETs, LTE signals such as a physical broadcast channel (PBCH), system information blocks (SIBs), among other transmissions with a physical resource block (PRB) symbol-like shape (e.g., rectangular in time-frequency space). For example, the base station 105-a may transmit a CORESET to the UE 115-b within a same PDSCH symbol that the base station 105-a transmits the data transmission 210-a to the UE 115-a. As such, the base station 105-a may indicate reserved resources to the UE 115-a, for example, for the UE 115-a to rate match the data transmission 210 around REs corresponding to the CORESET transmitted to the UE 115-b. In some cases, the reserved resources may be indicated semi-statically, for example, the reserved resources may be applied in a radio resource control (RRC) message, a MAC-CE message, a DCI message, or the like associated with data transmission 210-a.

Some wireless communications systems may lack support to revert, or otherwise ignore, rate matching. In cases where the base station 105-a rate matches data transmissions 210 around REs for other channels and signals, the base station 105-a may waste resource allocations, reducing signal throughput. In some examples, during occasions where the base station 105-a may perform beam management, or other procedures, to reduce interference of signals to a UE 115, the base station 105-a may forego transmitting data transmissions 210 (e.g., PDSCH transmissions) on REs otherwise decodable by a receiving UE 115. For example, the base station 105-*a* may perform beam management procedures to refine a beam and reduce interference with UE 115-*b*. In some cases, the base station 105-*a* may transmit beam management signals (e.g., SSBs, random access channel (RACH) messages) on one or more beams associated with UE 115-*b*. In such cases, the base station 105-*a* may also transmit the data transmission 210-*a* to the UE 115-*a*. The base station 105-*a* may configure UE 115-*a* to rate match the data transmission 210-*a* around REs associated with the beam management signals transmitted to the UE 115-*b*. However, in some cases, the UE 115-*a* may be operable to distinguish between one or more spatial layers such that the UE 115-*a* may be able to coherently receive the data transmission 210-*a* without rate matching the data transmission 210-*a* to the beam management signals. For example, the UE 115-*a* may be configured with an advanced receiver such that the UE 115-*a* may be able to distinguish between one or more spatial layers such that the UE 115-*a* may be able to receive the data transmission 210-*a* on REs configured for the beam management signals. In some examples, during occasions where signals are not received well by a UE 115 (e.g., depending on UE measurements), the base station 105-*a* may forego data transmissions 210 on REs associated with the poorly received signals. For example, the base station 105-*a* may transmit CRS signals and the base station 105-*a* may transmit the data transmission 210-*a* to the UE 115-*a*. In such examples, the base station 105-*a* may rate match the data transmission 210-*a* around REs associated with the CRS signals. However, the UE 115-*a* (e.g., an LTE UE) may receive the data transmission 210-*a*, with relatively low signal power as compared to the CRS signals. As such, rate matching the data transmission 210-*a* around REs associated with the CRS signals, or the other LTE signals, may waste transmission resources that may otherwise be used to transmit and receive the data transmission 210-*a*. In another example, the base station 105-*a* may transmit SSB, TRS, CSI-RS, or a combination thereof, for beam management in a direction different from the direction of a UE 115 receiving a data transmission 210 (e.g., QCLed to a direction different from the UE 115 receiving the data transmission 210). For example, the base station 105-*a* may transmit a TRS to the UE 115-*b* and may transmit the data transmission 210-*a* to the UE 115-*a*, rate matching the data transmission 210-*a* around the REs associated with the TRS. In the example of wireless communications system 200, the base station 105-*a* transmits the TRS in the direction of the UE 115-*b* which is different from the direction of the UE 115-*a*, resulting in a relatively low received signal power for the TRS at the UE 115-*a* as compared to the data transmission 210-*a*. As such, rate matching the data transmission 210-*a* around REs associated with the TRS signal may waste transmission resources which may otherwise be used to transmit and receive the data transmission 210-*a*. In yet other examples, during occasions where protected CORESETs are devoid of signals (e.g., DCI, DMRS) interfering with data transmissions 210, the base station 105-*a* may forego data transmissions 210 on REs associated with the signals. For example, the base station 105-*a* may configure one or more UEs 115 with a protected CORESET and may transmit the data transmission 210-*a* to the UE 115-*a*. In some cases, the base station 105-*a* may rate match the data transmission 210-*a* around the REs associated with the protected CORESET. However, in some cases, the base station 105-*a* may refrain from transmitting DCI, DMRS, among other signals on the protected CORESET, which may mitigate interference to the data transmission 210-*a*. In such cases, rate matching the data transmission 210-*a* around the REs associated with the protected CORESET may result in a waste of communication resources.

In some examples, wireless communications systems may support the use of a dynamic rate matching decision enabling a base station 105 to dynamically indicate a rate matching configuration, to a UE 115, indicating whether rate matching may be used in a specific data transmission 210. For example, the base station 105-*a* may include the rate matching configuration in control information 205 to the UE 115-*a*. In some examples, the base station 105-*a* may dynamically indicate the control information 205 as, or within, a DCI scheduling the data transmission 210-*a*. Multiple options for such a dynamic indication may balance a trade-off between signaling overhead and a flexibility of indicating specific resources (e.g., resources for rate matching). For example, the control information 205 may include a quantity of bits to select configured resources (e.g., CSI-RSs, CRS, CORESETS) for reverting rate matching (e.g., similar to bitmap patterns for rate matching). In some examples, the control information 205 may include more than one bit (e.g., two bits), where the quantity of bits may indicate reverting rate matching as well as a configuration of resources for reverting rate matching. For example, the control information 205 may indicate that the UE 115-*a* should avoid rate matching the data transmission 210-*a* as well as which REs the UE 115-*a* should avoid rate matching around. Such examples may be associated with relatively higher signal overhead, for example, as compared to including a single bit associated with reverting rate matching in the control information 205, but may be associated with relatively more resource selection flexibility. In some examples, the control information 205 may include a single bit, where the single bit may indicate reverting rate matching. For example, the control information 205 may indicate that the UE 115-*a* should avoid rate matching the data transmission 210-*a* around overlapping signals (e.g., signals overlapping with the REs of the data transmission 210). Such examples may be associated with relatively lower signal overhead, for example, as compared to including more than one bit associated with reverting rate matching in the control information 205, but may be associated with relatively less resource selection flexibility.

In some examples, transmitting control information 205 including the dynamic rate matching indication may further enable UEs 115 to dynamically manage interfering signals. In some examples, the control information 205 may configure the UE 115-*a* with information of CSI-RS (e.g., for acquisition, for tracking) that may be QCLed to SSBs associated with another UE 115, as rate matching may waste communication resources at the UE 115-*a* (e.g., due to beam separation between a beam associated with the UE 115-*a* and a beam associated with the UE 115-*b*). For example, the base station 105-*a* may transmit one or more CSI-RSs to UE 115-*b* which may be QCLed to an SSB. The UE 115-*a* may receive a rate matching configuration in control information 205, where the rate matching configuration may dynamically control whether the data channel may be rate matched around the interfering signals. As such, the UE 115-*a* may be configured with information of the REs associated with the one or more CSI-RSs. Enabling UEs 115 to be dynamically rate match other signals (e.g., CSI-RS) and with the rate matching configuration, with appropriate conditions, may enable UEs 115 to rate match with the interfering signals when rate matching may be beneficial (e.g., in scenarios where the other signals may interfere with received data transmissions 210).

Configuring UEs 115 with rate matching configurations may increase data transmission 210 throughput, for example, in scenarios where such UEs 115 may be operable to distinguish data transmissions 210 and one or more other, potentially interfering, signals. Using the techniques as described herein may thus improve communication resource usage, enhance coordination between communicating devices, and may increase the robustness of wireless communications.

Figure 3:
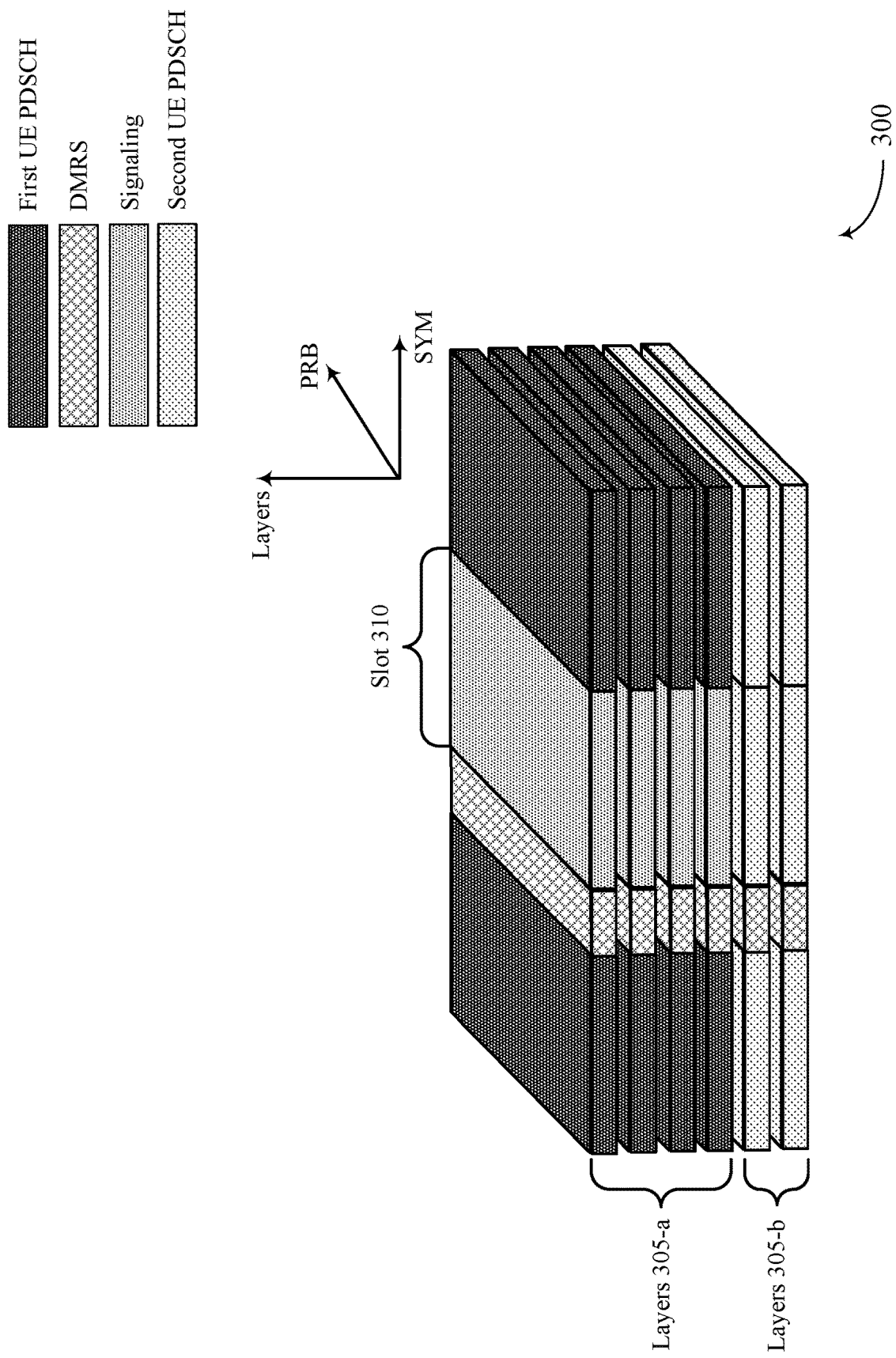
FIG. 3 illustrates an example of a mapping configuration that supports dynamic PDSCH mapping modes in accordance with aspects of the present disclosure.

FIG. 3 illustrates an example of a mapping configuration 300 that supports dynamic PDSCH mapping modes in accordance with aspects of the present disclosure. In some examples, the layer mapping configuration 300 may implement aspects of wireless communications system 100 or 200. In this example, a base station (e.g., base station 105-a as described with reference to FIG. 2) may transmit signaling on one or more layers 305 to one or more UEs (e.g., UE 115-a and UE 115-b as described with reference to FIG. 2), and may further transmit control information (e.g., control information 205 as described with reference to FIG. 2) dynamically indicating rate matching to the one or more UEs.

In some examples, the base station may transmit signaling to one or more UEs using one or more layers 305. For example, the base station may transmit signaling to a first UE using layers 305-a and signaling to a second UE using layers 305-b. In some cases, the layers 305 may be examples of different, orthogonal spatial layers (e.g., beams), logical layers (e.g., protocol layers), virtual layers (e.g., VRBs), among other layers. For example, the base station may transmit the layers 305-a to the first UE using four different beam-related layers and the base station may transmit the layers 305-b to the second UE using two different non-beam-related layers (e.g., logical layers, protocol layers, virtual layers). In some cases, the base station may transmit a combination of PDSCH (e.g., data transmissions 210 as described with reference to FIG. 2), DMRS, and other signals, in particular configurations, to the one or more UEs. For example, the base station may transmit PDSCH, DMRS, and one or more CSI-RSs to the first UE using the layers 305-a.

In some cases, the base station may transmit specific signals to the first UE including A-CSI-RS, CSI-RS for mobility, CSI-IM, PRS, as well as signals and channels unconfigured from the point of view of the second UE, such as CSI-RS QCLed to an SSB associated with the first UE, DCIs scheduling the first UE, LTE signals, among other signals and channels. For example, the base station may transmit one or more CSI-RSs for mobility to the first UE during resources in slot 310. In such examples, the base station may transmit control signaling to the second UE, providing the second UE with tools to rate match around the resources (e.g., transmitted in certain symbols in slot 310), for example, resources associated with the CSI-RSs for mobility. The base station may provide the second UE with tools to rate match (or cancel rate matching) around resources in the time domain, the frequency domain, among other distinguishable domains associated with wireless communications. In some cases, the base station may transmit a CSI-RS to the second UE, where in some cases, the base station may transmit control signaling to the second UE, enabling the second UE to cancel rate matching around the resources associated with signaling to the first UE (e.g., CSI-RSs QCLed to an SSB associated with the first UE). For example, the base station may transmit a ZP-CSI-RS to the second UE, where the ZP-CSI-RS may have a similar structure to a CSI-IM transmitted to the first UE. The base station may transmit control signaling to the second UE, enabling the second UE to cancel rate matching around the resources associated with the CSI-IM. As such, the second UE may receive the ZP-CSI-RS and may cancel rate matching around the resources associated with the CSI-IM for the first UE. In some cases, the base station may indicate reserved resources to the second UE, enabling the second UE to rate match around the resources associated with signals and channels unconfigured from the point of view of the second UE (e.g., CORESETs, PBCH, SIBs). For example, the base station may indicate, to the second UE, one or more reserved resources associated with a CORESET configured for the first UE. As such, the second UE may identify the reserved resources and may rate match around the reserved resources.

In some examples, configuring the second UE to rate match around signaling for the first UE may be deficient, for example, in scenarios where the second UE may be operable to distinguish between layers 305 and coherently receive signaling for the second UE without rate matching. For example, during resources in slot 310, the base station may perform beam management, or other procedures, to reduce interference of signals to the second UE, where the base station may forego transmitting PDSCH during resources in slot 310 (e.g., on resources otherwise decodable by the second UE). For example, the base station may transmit beam management signals to refine one or more beams at the first UE, and to reduce interference with the second UE. In such cases, the base station may rate match the layers 305-b around resources in slot 310 and other resources corresponding to beam management signals transmitted to the first UE. However, the second UE may be operable to distinguish between one or more spatial layers such that the second UE may be able to coherently receive layers 305-b during resources in slot 310 without rate matching around the beam management signals. For example, the second UE may have an advanced receiver such that the second may be able to distinguish between one or more layers 305 with sufficient granularity to filter through individual layers 305. In some examples, during resources in slot 310, signals may not be received well by the second UE, but the base station may forego signaling PDSCH on resources associated with the poorly received signals. For example, the base station may transmit CRS signals to the first UE during resources in slot 310. In such examples, the base station may rate match the layers 305-b around resources associated with the CRS signals, or other LTE signals, transmitted to the first UE. However, the second UE may receive the CRS signals, or other LTE signals, with relatively poor signal quality (e.g., as compared to signals on layers 305-b). As such, rate matching the layers 305-b around REs associated with the CRS signals, or the other LTE signals, may waste transmission resources that may otherwise be used to transmit and receive PDSCH. In yet other examples, during slot 310, the base station may configure protected CORESETs devoid of signals (e.g., DCI, DMRS) interfering with layers 305-b. In such examples, the base station may rate match the layers 305-b during resources in slot 310 associated with the protected CORESETs. For example, the base station may configure one or more UEs with a protected CORESET and may transmit layers 305-b to the second UE. In some cases, the base station may rate match the layers 305-b around the resources in slot 310 and other resources associated with the protected CORESET. However, in some cases, the base station may refrain from transmitting DCI, DMRS, among other signals on the protected CORESET, which may mitigate interference to communications on the layers 305-b. In such cases, rate matching the layers 305-*b* around the resources associated with the protected CORESET may result in a waste of communication resources.

In some examples, the base station may transmit control information to the second UE, indicating to the second UE to receive the layers 305-*b* without rate matching. In other words, the base station may transmit a rate matching configuration to the second UE, where the rate matching configuration may indicate rate matching reversion. For example, the base station may transmit a CSI-IM to the first UE during slot 310 on layers 305-*a*. In such examples, the base station may dynamically transmit a DCI scheduling PDSCH for the second UE, where the DCI may include an indication for the second UE to receive layers 305-*b* without rate matching. That is, upon receiving the DCI, the second UE may identify a rate matching configuration, instructing the second UE to receive PDSCH during slot 310 on layers 305-*b*. In some examples, the rate matching configuration may be indicated using a bit field, for example, in a reserved bit field in a DCI scheduling PDSCH for the second UE. In some examples, the bit field may include more than one bit to indicate rate matching reversion and to select configured resources for the rate matching reversion. For example, the base station may transmit a DCI scheduling a PDSCH to the second UE, where the DCI may include two bits for a rate matching configuration. In such examples, one bit of the two bits may be used for indicating whether the PDSCH is transmitted with rate matching (e.g., around signaling to the first UE) and the other bit of the two bits may be used for indicating a configuration of resources for rate matching. For example, a first bit may indicate that the second UE may receive PDSCH on layers 305-*b* without rate matching and a second bit may indicate which resources are associated with rate matching reversion, for example, slot 310. In some examples, the bit field may include a single bit to indicate rate matching reversion. For example, the base station may transmit a DCI scheduling a PDSCH to the second UE, where the DCI may include a single bit for a rate matching configuration. In such examples, the single bit may be used to indicate whether the PDSCH is transmitted with rate matching. For example, the single bit may indicate that the second UE may receive PDSCH on layers 305-*b* without rate matching (e.g., avoid rate matching any signal overlapping in time-frequency space).

In some examples, transmitting the rate matching configuration to the second UE may enable the second UE to be aware of interfering signals. For example, indicating whether PDSCH is transmitted with rate matching may allow the UE to be aware of CSI-RS that may be QCLed to an SSB configured for the first UE. That is, indicating rate matching reversion may enable the second UE to be aware of potentially interfering signals in a wireless communications system. In some examples, this method may allow the base station to configure the second UE with CSI-RS configurations, enabling the second UE to revert rate matching in appropriate scenarios (e.g., based on UE measurements, signaling from the base station), handling cases where rate matching may be beneficial (e.g., when signaling to the first UE imparts significant interference to communications on layers 305-*b*).

Figure 4:
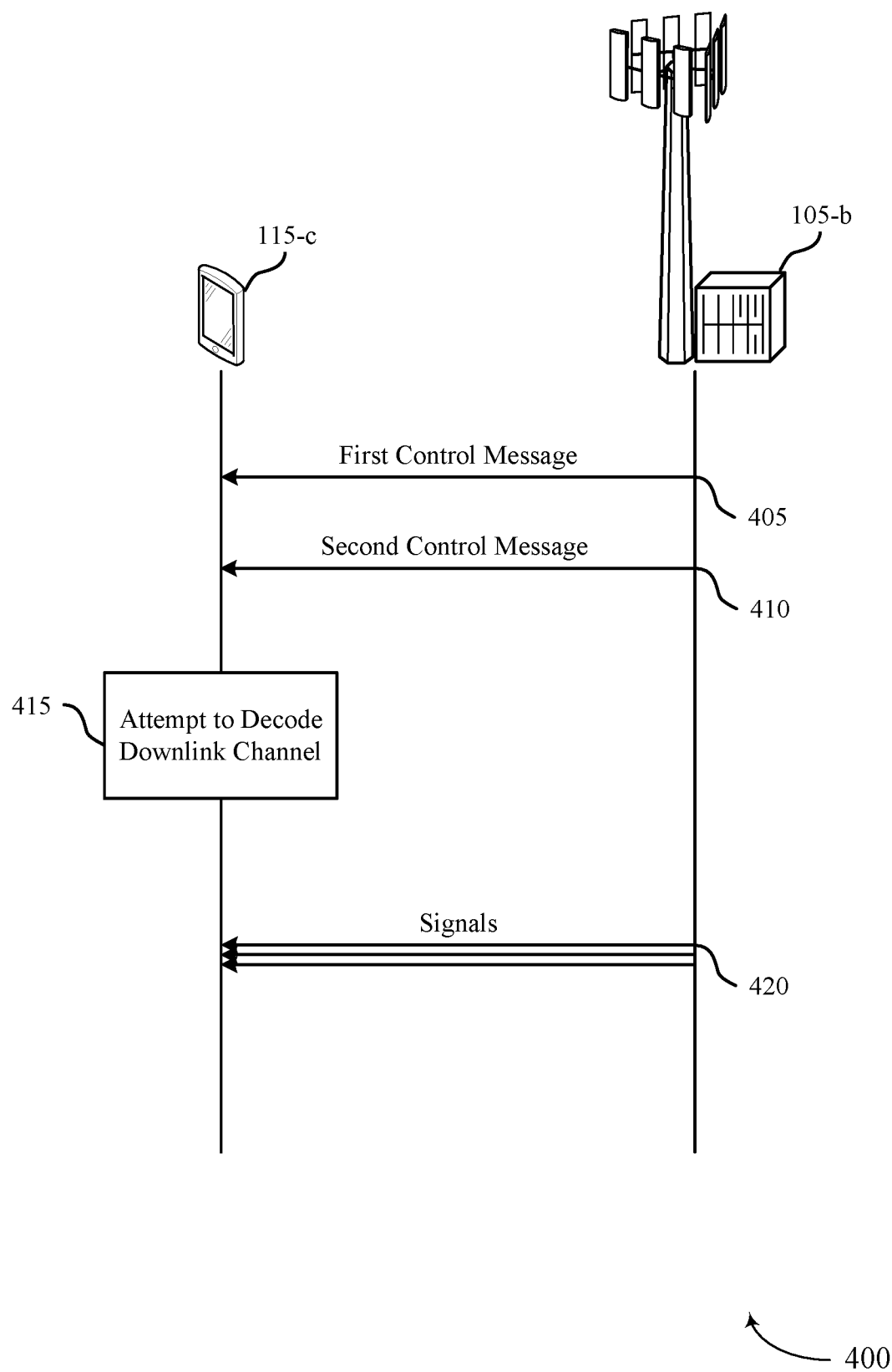
FIG. 4 illustrates an example of a process flow that supports dynamic PDSCH mapping modes in accordance with aspects of the present disclosure.

FIG. 4 illustrates an example of a process flow 400 that supports dynamic PDSCH mapping modes in accordance with aspects of the present disclosure. In some examples, the process flow 400 may implement aspects of wireless communications systems 100 or 200. For example, process flow 400 may include a UE 115-*c* and a base station 105-*b*, which may be examples of corresponding devices as described with reference to FIGS. 1 through 3. In some cases, the base station 105-*b* may transmit control information including a rate matching configuration for the UE 115-*c* to receive subsequent signaling.

In the following description of the process flow 400, the operations may be performed (e.g., reported or provided) in a different order than the order shown, or the operations performed by the UE 115-*c* and the base station 105-*b* may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

At 405, the base station 105-*b* may transmit, and the UE 115-*c* may receive, a first control message identifying one or more sets of resources around which the UE 115-*c* may rate match for a downlink channel. For example, the first control message may identify one or more sets of resources associated with signaling to one or more other UEs 115 (e.g., CSI-RSs, SRS). In some examples, the one or more sets of resources may include a set of resources for a CSI-RS, a CRS, a CORESET, an SSB, a PBCH, an SIB, a TRS, or a combination thereof. In such examples, the CSI-RS may include a P-CSI-RS, an A-CSI-RS, a CSI-RS for mobility, a CSI-IM, or a combination thereof.

In some examples, the first control message identifying the one or more sets of resources may be or include a message from a base station indicating one or more signals transmitted by the base station to a second device. In one example, based on being configured to rate match, the UE may determine whether to measure the one or more signals (e.g., when rate matching) the one or more signals or defer from (e.g., not perform rate matching for a certain time period) measuring the one or more signals (e.g., when not rate matching). In some examples, the determination may be based on an indication received from the base station. In other examples, the determination may be performed by the UE (e.g., autonomously, based on information at the UE). In some examples, a combination of these may be used for the determination.

At 410, the base station 105-*b* may transmit, and the UE 115-*c* may receive a second control message including an indication that the UE 115-*c* may perform one of rate matching around at least one set of resources of the one or more sets of resources or receiving the downlink channel on the at least one set of resources. That is, the indication may indicate to the UE 115-*c* either rate matching one the one or more sets of resources, or spatial separation associated with the at least one set of resources. In some examples, the indication may be a first indication and the UE 115-*c* may receive, in the second control message, a second indication that the UE 115-*c* may perform a different one of rate matching around at least one second set of resources of the one or more sets of resources or receiving the downlink channel on the at least one second set of resources. For example, the indication may identify that the UE 115-*c* may perform rate matching around the at least one set of resources of the one or more sets of resources based at least in part on the at least one set of resources being transmitted on resources spatially related to the downlink channel and the second indication identifies that the UE 115-*c* may perform receiving the downlink channel on the at least one set of resources based at least in part on the at least one set of resources being transmitted on resources spatially separate from the downlink channel. That is, the indication may identify rate matching around the at least one set of resources and the second indication identifies that the UE 115-c may receive the downlink channel on the at least one set of resources based on the at least one second set of resources being transmitted on a different layer. In another example, the indication may identify that the UE 115-c may perform rate matching around the at least one set of resources of the one or more sets of resources based at least in part on the at least one set of resources having a same QCL relationship with a first SSB transmitted on resources spatially related to the downlink channel and the second indication may identify that the UE 115-c may perform receiving the downlink channel on the at least one set of resources based at least in part on the at least on second set of resources being transmitted on resources spatially separate from the downlink channel. In other words, the UE 115-c may be configured to rate match around the at least one set of resources based on the at least one set of resources being QCLed to an SSB on the downlink channel associated with a different device (e.g., UE 115) and the UE 115-c may receive the downlink channel accordingly.

In some examples, the one or more sets of resources may include multiple sets of resources and receiving the second control message may include receiving multiple bits in the second control message, where each bit of the multiple bits may correspond to one set of resources of the multiple sets of resources and each bit may indicate that the UE 115-c may perform one of rate matching around the one set of resources or receiving the downlink channel on the one set of resources. That is, the UE 115-c may be configured with multiple resources and the second control message may include a bit field to indicate which resource of the multiple resources the UE 115-c may use to rate match or receive the downlink channel. In some examples, the UE 115-c may receive a single bit in the second control message, where the single bit may indicate that the UE 115-c may perform one of rate matching around the multiple sets of resources or receiving the downlink channel on the multiple sets of resources. In other words, the single bit may indicate whether rate matching is configured or spatial separation is configured.

In some examples, the base station 105-b may transmit, and the UE 115-c may receive, in the second control message, a grant of resources for the downlink channel, where signaling may be received on the downlink channel based at least in part on both the grant of resources and the indication received in the second control message. In some examples, one or more sets of resources (e.g., indicated by the grant) may include a set of resources for a (CSI-RS), a CRS, a CORESET, an SSB, a PBCH, an SIB, a TRS, a PRS, or any combination of these.

At 415, the UE 115-c may attempt to decode the downlink channel. In some examples, the UE 115-c may attempt to decode the downlink channel on resources exclusive of (e.g., different from and not including the resources of) the at least one set of resources based at least in part on the indication of the received second control message indicating that the UE 115-c may perform rate matching around the at least one set of resources. Phrased alternatively, in some cases, the UE 115-c may receive the downlink channel using rate matching as indicated by the base station 105-b. In some examples, the UE 115-c may attempt to decode the downlink channel on resources that include the at least one set of resources based at least in part on the indication of the received second control message indicating that the UE 115-c may receive the downlink channel on the at least one set of resources. In such examples, the UE 115-c may receive the downlink channel using spatial separation, for example, in cases where the UE 115-c may distinguish one or more layers (e.g., with an advanced receiver).

At 420, the base station 105-b may transmit, and the UE 115-c may receive signals on the downlink channel according to the indication received in the second control message at 410. While depicted in process flow 400 as occurring in separate events, in some cases, steps 415 and 420 may be performed using the same resources (e.g., time, frequency, or both) and at the same step.

Configuring the base station 105-b and the UE 115-c to communicate in accordance with the rate matching configuration as described herein may support a communications environment where the UE 115-c may revert rate matching which may enable the base station 105-b and the UE 115-c to communicate larger data payloads, reduce system latency, and use communication resources more efficiently.

Figure 5:
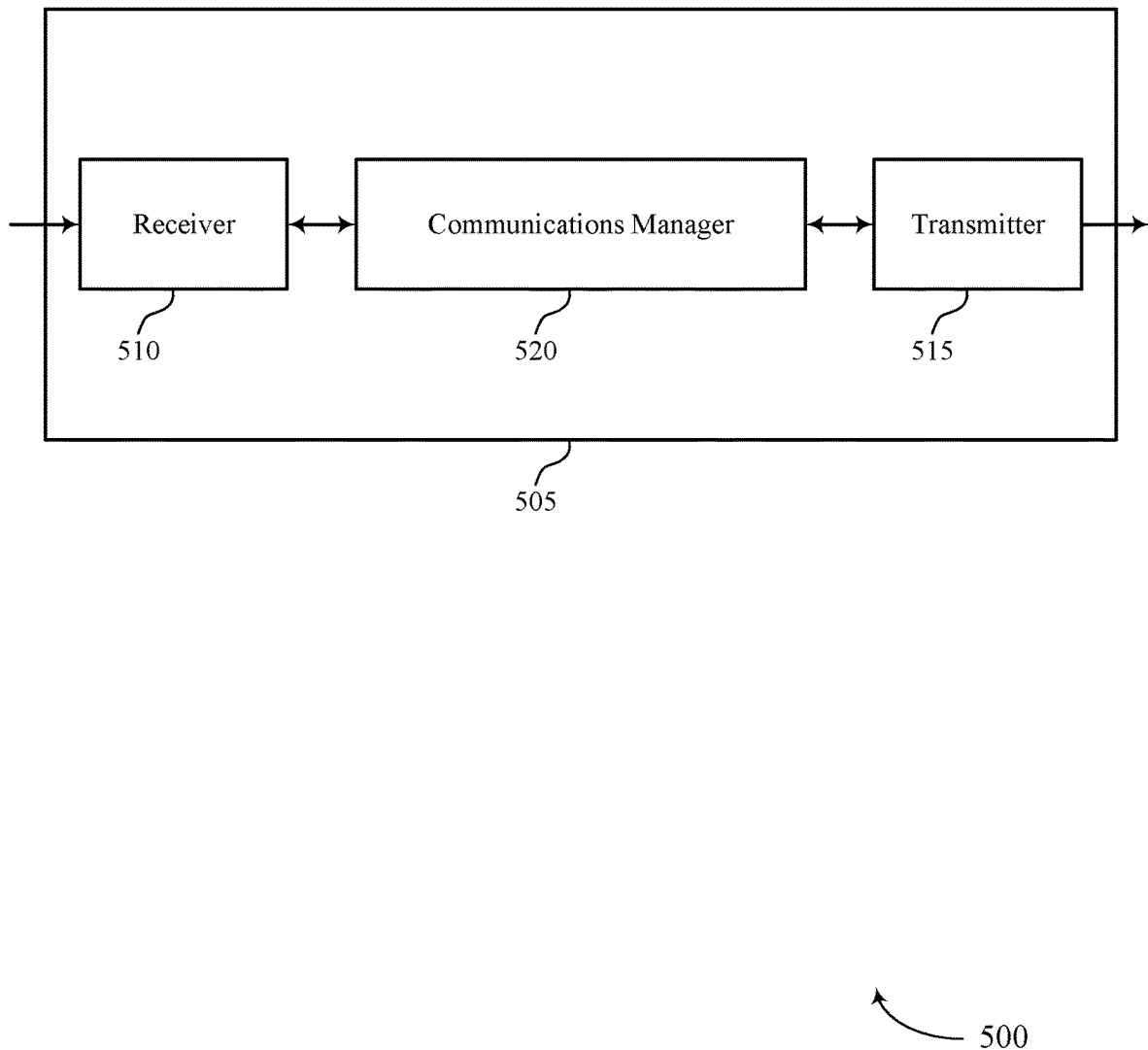
FIGS. 5 and 6 show block diagrams of devices that support dynamic PDSCH mapping modes in accordance with aspects of the present disclosure.

FIG. 5 shows a block diagram 500 of a device 505 that supports dynamic PDSCH mapping modes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic PDSCH mapping modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic PDSCH mapping modes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic PDSCH mapping modes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a first control message identifying one or more sets of resources around which the UE is to rate match for a downlink channel. The communications manager 520 may be configured as or otherwise support a means for receiving a second control message including an indication that the UE is to perform one of rate matching around at least one set of resources of the one or more sets of resources or receiving the downlink channel on the at least one set of resources. The communications manager 520 may be configured as or otherwise support a means for receiving signals on the downlink channel according to the indication received in the second control message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a rate matching configuration enabling the UE to revert rate matching and receive data during otherwise rate matched resources, resulting in higher signal throughput and more efficient utilization of communication resources.

Figure 6:
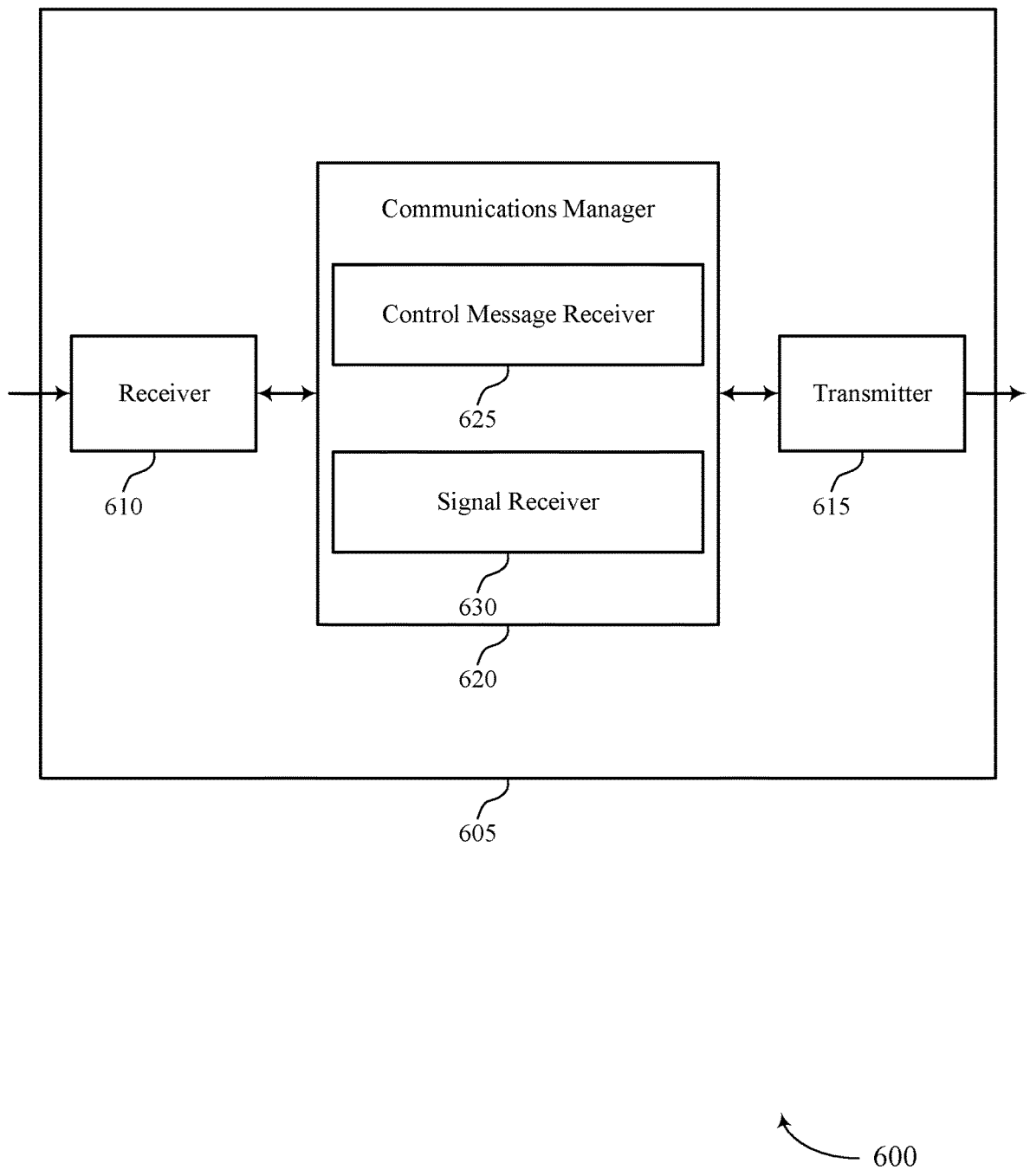

FIG. 6 shows a block diagram 600 of a device 605 that supports dynamic PDSCH mapping modes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic PDSCH mapping modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic PDSCH mapping modes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic PDSCH mapping modes as described herein. For example, the communications manager 620 may include a control message receiver 625 a signal receiver 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control message receiver 625 may be configured as or otherwise support a means for receiving a first control message identifying one or more sets of resources around which the UE is to rate match for a downlink channel. The control message receiver 625 may be configured as or otherwise support a means for receiving a second control message including an indication that the UE is to perform one of rate matching around at least one set of resources of the one or more sets of resources or receiving the downlink channel on the at least one set of resources. The signal receiver 630 may be configured as or otherwise support a means for receiving signals on the downlink channel according to the indication received in the second control message.

Figure 7:
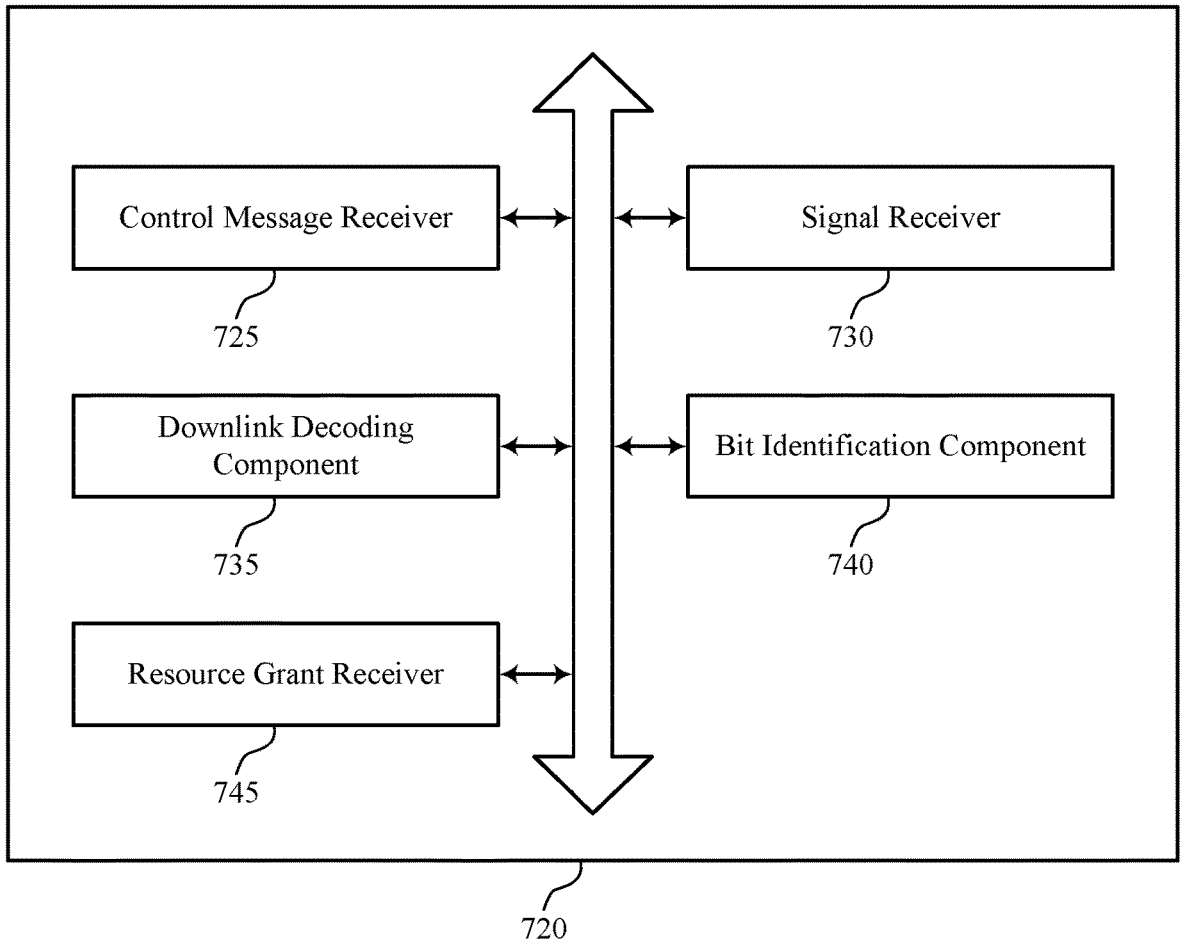
FIG. 7 shows a block diagram of a communications manager that supports dynamic PDSCH mapping modes in accordance with aspects of the present disclosure.

FIG. 7 shows a block diagram 700 of a communications manager 720 that supports dynamic PDSCH mapping modes in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic PDSCH mapping modes as described herein. For example, the communications manager 720 may include a control message receiver 725, a signal receiver 730, a downlink decoding component 735, a bit identification component 740, a resource grant receiver 745, or any combination thereof. Each of these components may communicate, directly or indirectly, with one another (e.g., via one or more buses).

The communications manager 720 may support wireless communication at a UE in accordance with examples as disclosed herein. The control message receiver 725 may be configured as or otherwise support a means for receiving a first control message identifying one or more sets of resources around which the UE is to rate match for a downlink channel. In some examples, the control message receiver 725 may be configured as or otherwise support a means for receiving a second control message including an indication that the UE is to perform one of rate matching around at least one set of resources of the one or more sets of resources or receiving the downlink channel on the at least one set of resources. The signal receiver 730 may be configured as or otherwise support a means for receiving signals on the downlink channel according to the indication received in the second control message.

In some examples, to support receiving the signals on the downlink channel, the downlink decoding component 735 may be configured as or otherwise support a means for attempting to decode the downlink channel on resources exclusive of the at least one set of resources based on the indication of the received second control message indicating that the UE is to perform rate matching around the at least one set of resources.

In some examples, to support receiving the signals on the downlink channel, the downlink decoding component 735 may be configured as or otherwise support a means for attempting to decode the downlink channel on resources that include the at least one set of resources based on the indication of the received second control message indicating that the UE is to receive the downlink channel on the at least one set of resources.

In some examples, the indication includes a first indication, and the control message receiver 725 may be configured as or otherwise support a means for receiving, in the second control message, a second indication that the UE is to perform a different one of rate matching around at least one second set of resources of the one or more sets of resources or receiving the downlink channel on the at least one second set of resources.

In some examples, the indication identifies that the UE is to perform rate matching around the at least one set of resources of the one or more sets of resources based on the at least one set of resources being transmitted on resources spatially related to the downlink channel. In some examples, the second indication identifies that the UE is to perform receiving the downlink channel on the at least one set of resources based on the at least one second set of resources being transmitted on resources spatially separate from the downlink channel.

In some examples, the indication identifies that the UE is to perform rate matching around the at least one set of resources of the one or more sets of resources based on the at least one set of resources having a same QCL relationship with a first SSB transmitted on resources spatially related to the downlink channel. In some examples, the second indication identifies that the UE is to perform receiving the downlink channel on the at least one set of resources based on the at least one second set of resources being transmitted on resources spatially separate from the downlink channel.

In some examples, the one or more sets of resources include a set of multiple sets of resources and, to support receiving the second control message, the bit identification component 740 may be configured as or otherwise support a means for receiving a set of multiple bits in the second control message, where each bit of the set of multiple bits corresponds to one set of resources of the set of multiple sets of resources, and each bit indicates that the UE is to perform one of rate matching around the one set of resources or receiving the downlink channel on the one set of resources.

In some examples, the one or more sets of resources include a set of multiple sets of resources and, to support receiving the second control message, the bit identification component 740 may be configured as or otherwise support a means for receiving a single bit in the second control message, where the single bit indicates that the UE is to perform one of rate matching around the set of multiple sets of resources or receiving the downlink channel on the set of multiple sets of resources.

In some examples, to support receiving a second control message, the resource grant receiver 745 may be configured as or otherwise support a means for receiving, in the second control message, a grant of resources for the downlink channel, the signal received on the downlink channel based on both the grant of resources and the indication received in the second control message.

In some examples, the one or more sets of resources include a set of resources for a CSI-RS, a CSR, a CORESET, an SSB, a PBCH, an SIB, a TRS, or any combination thereof.

In some examples, the CSI-RS includes a P-CSI-RS, an A-CSI-RS, a CSI-RS for mobility, a CSI-IM, or any combination thereof.

Figure 8:
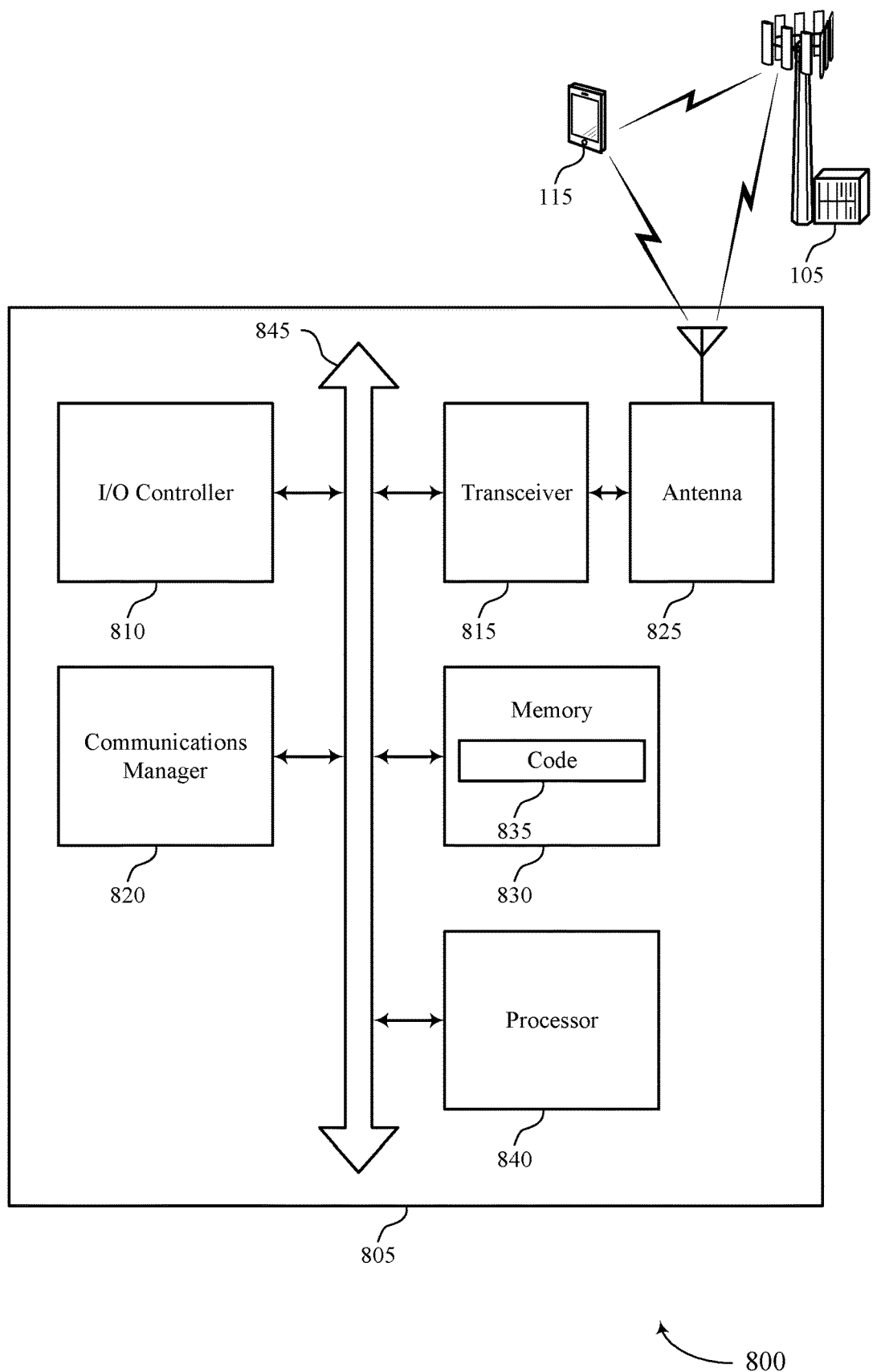
FIG. 8 shows a diagram of a system including a device that supports dynamic PDSCH mapping modes in accordance with aspects of the present disclosure.

FIG. 8 shows a diagram of a system 800 including a device 805 that supports dynamic PDSCH mapping modes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic PDSCH mapping modes). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first control message identifying one or more sets of resources around which the UE is to rate match for a downlink channel. The communications manager 820 may be configured as or otherwise support a means for receiving a second control message including an indication that the UE is to perform one of rate matching around at least one set of resources of the one or more sets of resources or receiving the downlink channel on the at least one set of resources. The communications manager 820 may be configured as or otherwise support a means for receiving signals on the downlink channel according to the indication received in the second control message.

By including or configuring the communications manager 820 in accordance with examples as described herein, the device 805 may support techniques for a rate matching configuration enabling the UE to revert rate matching and receive data during otherwise rate matched resources, resulting in reduced latency, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic PDSCH mapping modes as described herein, or the processor 840 and the memory 830 may be otherwise configured to perform or support such operations.

Figure 9:
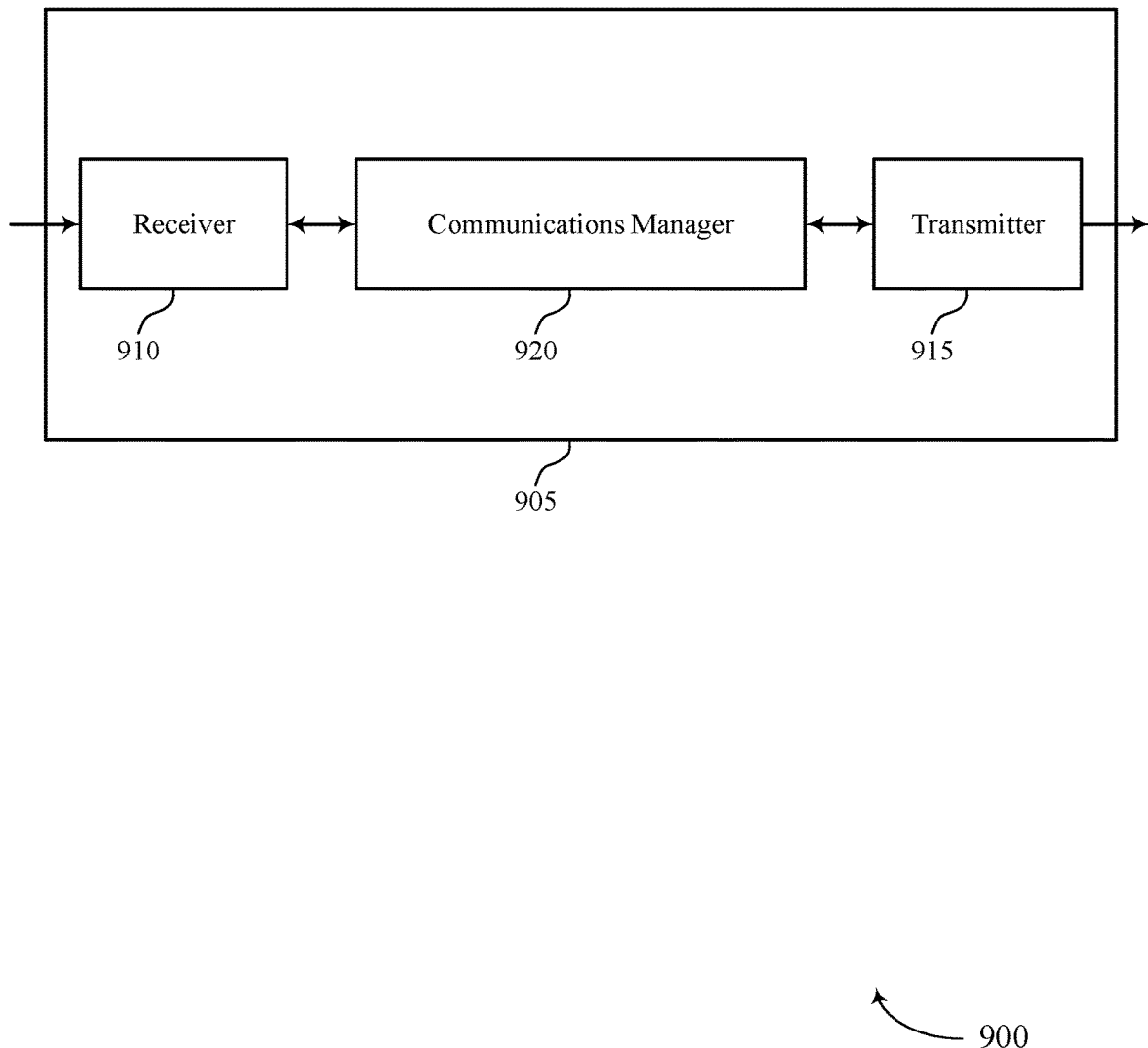
FIGS. 9 and 10 show block diagrams of devices that support dynamic PDSCH mapping modes in accordance with aspects of the present disclosure.

FIG. 9 shows a block diagram 900 of a device 905 that supports dynamic PDSCH mapping modes in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic PDSCH mapping modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic PDSCH mapping modes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic PDSCH mapping modes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a first control message identifying a configuration of one or more sets of resources around which the UE is to rate match for a downlink channel. The communications manager 920 may be configured as or otherwise support a means for transmitting a second control message including an indication that the UE is to perform one of rate matching around at least one set of resources of the one or more sets of resources or receiving the downlink channel on the at least one set of resources. The communications manager 920 may be configured as or otherwise support a means for transmitting signals on the downlink channel according to the indication received in the second control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the base station to transmit a rate matching configuration enabling a UE to revert rate matching and receive data during otherwise rate matched resources, resulting in higher signal throughput and more efficient utilization of communication resources.

Figure 10:
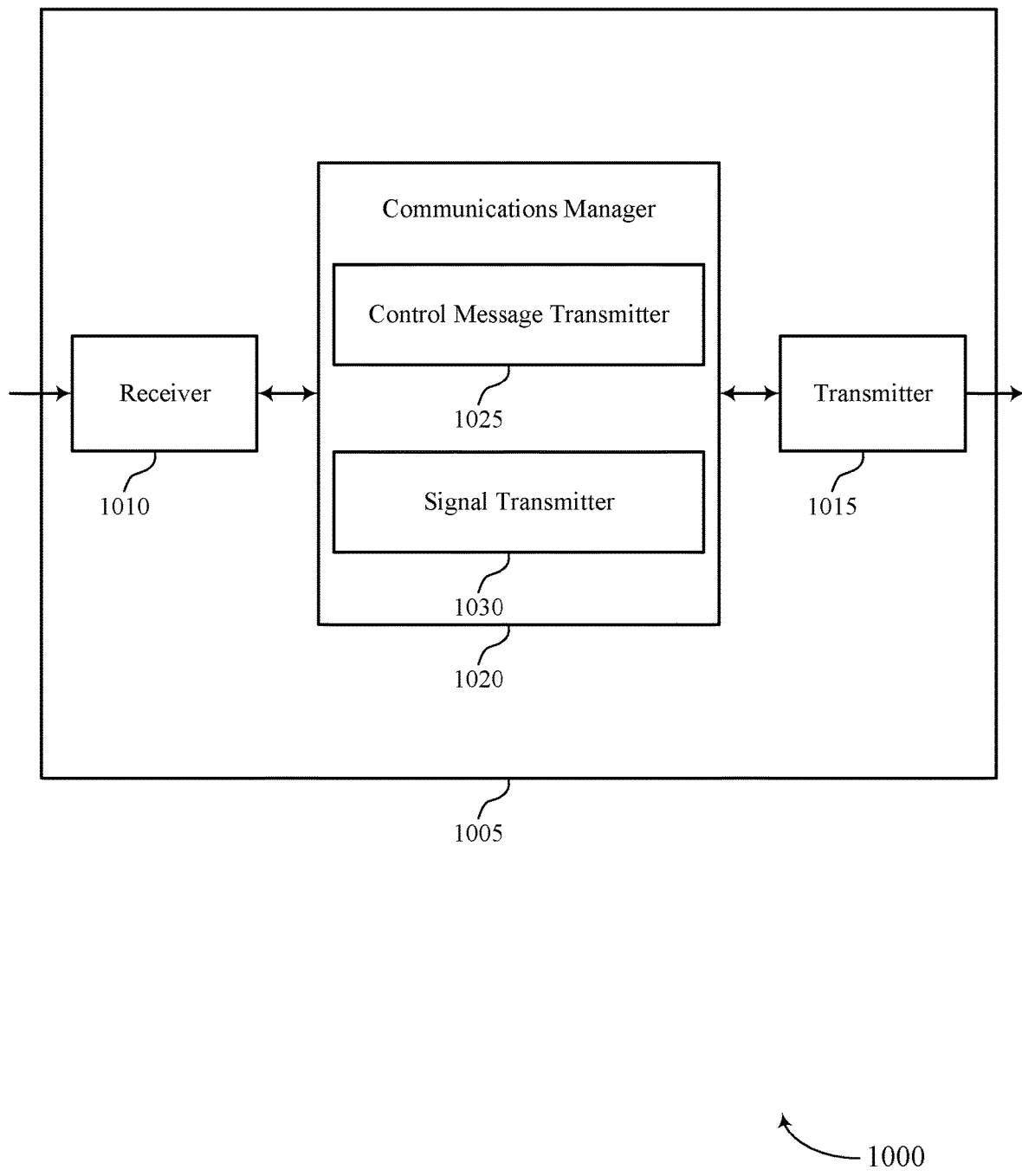

FIG. 10 shows a block diagram 1000 of a device 1005 that supports dynamic PDSCH mapping modes in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic PDSCH mapping modes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic PDSCH mapping modes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic PDSCH mapping modes as described herein. For example, the communications manager 1020 may include a control message transmitter 1025 a signal transmitter 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control message transmitter 1025 may be configured as or otherwise support a means for transmitting, to a UE, a first control message identifying a configuration of one or more sets of resources around which the UE is to rate match for a downlink channel. The control message transmitter 1025 may be configured as or otherwise support a means for transmitting a second control message including an indication that the UE is to perform one of rate matching around at least one set of resources of the one or more sets of resources or receiving the downlink channel on the at least one set of resources. The signal transmitter 1030 may be configured as or otherwise support a means for transmitting signals on the downlink channel according to the indication received in the second control message.

Figure 11:
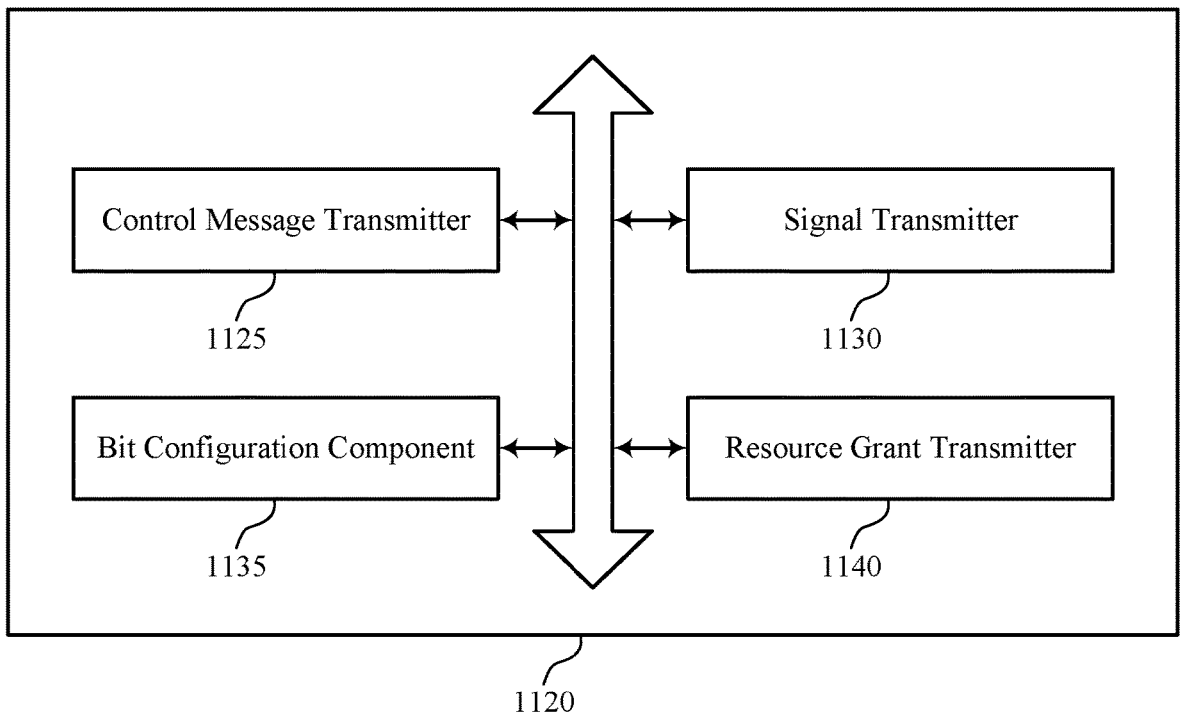
FIG. 11 shows a block diagram of a communications manager that supports dynamic PDSCH mapping modes in accordance with aspects of the present disclosure.

FIG. 11 shows a block diagram 1100 of a communications manager 1120 that supports dynamic PDSCH mapping modes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic PDSCH mapping modes as described herein. For example, the communications manager 1120 may include a control message transmitter 1125, a signal transmitter 1130, a bit configuration component 1135, a resource grant transmitter 1140, or any combination thereof. Each of these components may communicate, directly or indirectly, with one another (e.g., via one or more buses).

The communications manager 1120 may support wireless communication at a base station in accordance with examples as disclosed herein. The control message transmitter 1125 may be configured as or otherwise support a means for transmitting, to a UE, a first control message identifying a configuration of one or more sets of resources around which the UE is to rate match for a downlink channel. In some examples, the control message transmitter 1125 may be configured as or otherwise support a means for transmitting a second control message including an indication that the UE is to perform one of rate matching around at least one set of resources of the one or more sets of resources or receiving the downlink channel on the at least one set of resources. The signal transmitter 1130 may be configured as or otherwise support a means for transmitting signals on the downlink channel according to the indication received in the second control message.

In some examples, to support transmitting the signals on the downlink channel, the signal transmitter 1130 may be configured as or otherwise support a means for transmitting the downlink channel on resources exclusive of the at least one set of resources based on the indication of the received second control message indicating that the UE is to perform rate matching around the at least one set of resources.

In some examples, to support transmitting the signals on the downlink channel, the signal transmitter 1130 may be configured as or otherwise support a means for transmitting the downlink channel on resources that include the at least one set of resources based on the indication of the received second control message indicating that the UE is to receive the downlink channel on the at least one set of resources.

In some examples, the indication includes a first indication, and the control message transmitter 1125 may be configured as or otherwise support a means for transmitting, in the second control message, a second indication that the UE is to perform a different one of rate matching around at least one second set of resources of the one or more sets of resources or receiving the downlink channel on the at least one second set of resources.

In some examples, the indication identifies that the UE is to perform rate matching around the at least one set of resources of the one or more sets of resources based on the at least one set of resources being transmitted on resources spatially related to the downlink channel. In some examples, the second indication identifies that the UE is to perform receiving the downlink channel on the at least one set of resources based on the at least one second set of resources being transmitted on resources spatially separate from the downlink channel.

In some examples, the indication identifies that the UE is to perform rate matching around the at least one set of resources of the one or more sets of resources based on the at least one set of resources having a same QCL relationship with a first SSB transmitted on resources spatially related to the downlink channel. In some examples, the second indication identifies that the UE is to perform receiving the downlink channel on the at least one set of resources based on the at least one second set of resources being transmitted on resources spatially separate from the downlink channel.

In some examples, the one or more sets of resources include a set of multiple sets of resources and, to support transmitting the second control message, the bit configuration component 1135 may be configured as or otherwise support a means for transmitting a set of multiple bits in the second control message, where each bit of the set of multiple bits corresponds to one set of resources of the set of multiple sets of resources, and each bit indicates that the UE is to perform one of rate matching around the one set of resources or receiving the downlink channel on the one set of resources.

In some examples, the one or more sets of resources include a set of multiple sets of resources and, to support transmitting the second control message, the bit configuration component 1135 may be configured as or otherwise support a means for transmitting a single bit in the second control message, where the single bit indicates that the UE is to perform one of rate matching around the set of multiple sets of resources or receiving the downlink channel on the set of multiple sets of resources.

In some examples, to support transmitting a second control message, the resource grant transmitter 1140 may be configured as or otherwise support a means for transmitting, in the second control message, a grant of resources for the downlink channel, the signal received on the downlink channel based on both the grant of resources and the indication received in the second control message.

In some examples, the one or more sets of resources include a set of resources for a CSI-RS, a cell specific reference signal, a CORESET, an SSB, a PBCH, an SIB, a TRS, or any combination thereof.

In some examples, the CSI-RS includes a P-CSI-RS, an A-CSI-RS, a CSI-RS for mobility, a CSI-IM, or any combination thereof.

Figure 12:
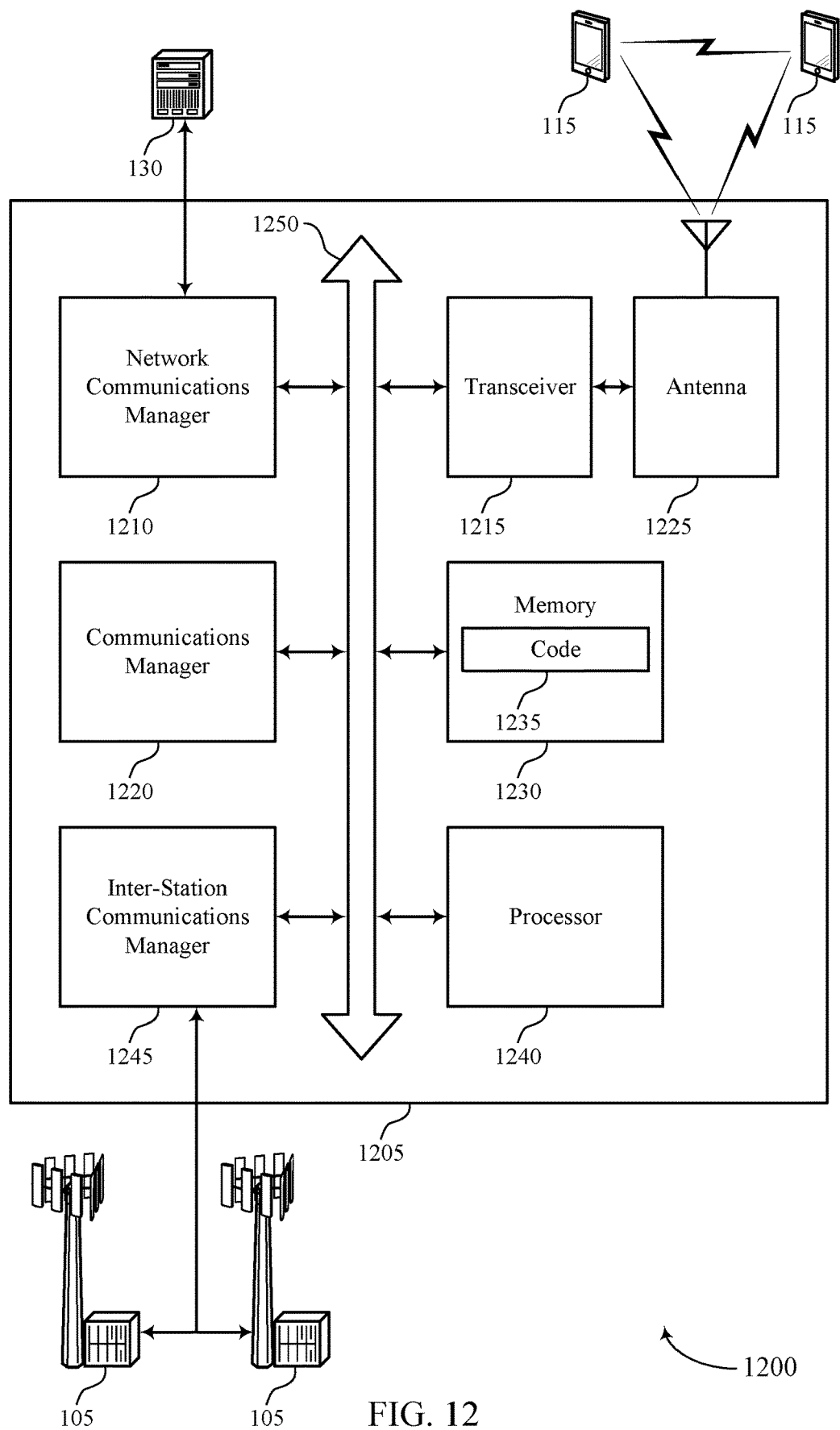
FIG. 12 shows a diagram of a system including a device that supports dynamic PDSCH mapping modes in accordance with aspects of the present disclosure.

FIG. 12 shows a diagram of a system 1200 including a device 1205 that supports dynamic PDSCH mapping modes in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic PDSCH mapping modes). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a first control message identifying a configuration of one or more sets of resources around which the UE is to rate match for a downlink channel. The communications manager 1220 may be configured as or otherwise support a means for transmitting a second control message including an indication that the UE is to perform one of rate matching around at least one set of resources of the one or more sets of resources or receiving the downlink channel on the at least one set of resources. The communications manager 1220 may be configured as or otherwise support a means for transmitting signals on the downlink channel according to the indication received in the second control message.

By including or configuring the communications manager 1220 in accordance with examples as described herein, the device 1205 may support techniques for the base station transmitting a rate matching configuration enabling a to revert rate matching and receive data during otherwise rate matched resources, resulting in reduced latency, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic PDSCH mapping modes as described herein, or the processor 1240 and the memory 1230 may be otherwise configured to perform or support such operations.

Figure 13:
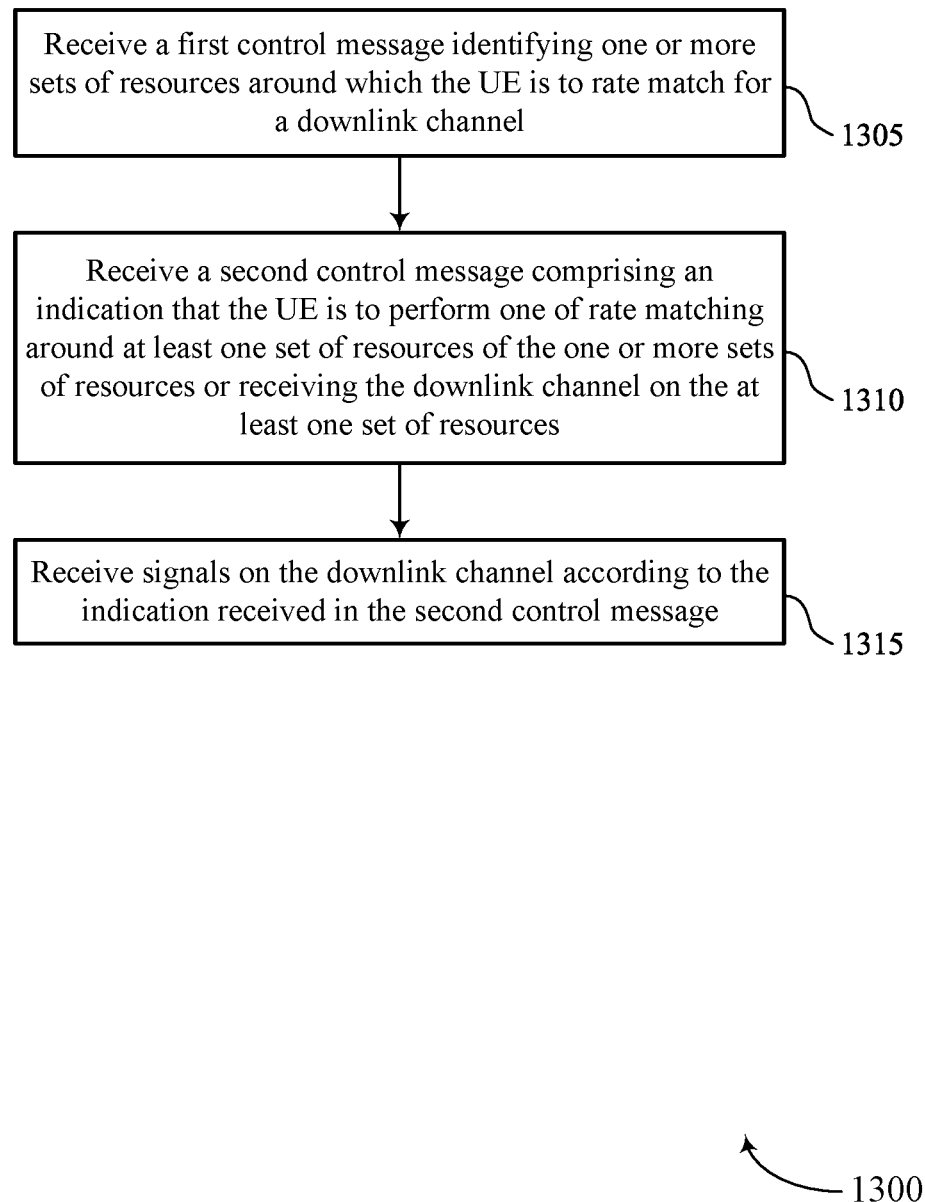
FIGS. 13 through 18 show flowcharts illustrating methods that support dynamic PDSCH mapping modes in accordance with aspects of the present disclosure.

FIG. 13 shows a flowchart illustrating a method 1300 that supports dynamic PDSCH mapping modes in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a first control message identifying one or more sets of resources around which the UE is to rate match for a downlink channel. The operations of 1305 may be performed in accordance with examples as disclosed herein. In some examples, aspects of the operations of 1305 may be performed by a control message receiver 725 as described with reference to FIG. 7.

At 1310, the method may include receiving a second control message including an indication that the UE is to perform one of rate matching around at least one set of resources of the one or more sets of resources or receiving the downlink channel on the at least one set of resources. The operations of 1310 (e.g., rate matching, rate match cancelling) may be performed in accordance with examples as disclosed herein. In some examples, aspects of the operations of 1310 may be performed by a control message receiver 725 as described with reference to FIG. 7.

At 1315, the method may include receiving signals on the downlink channel according to the indication received in the second control message. The operations of 1315 may be performed in accordance with examples as disclosed herein. In some examples, aspects of the operations of 1315 may be performed by a signal receiver 730 as described with reference to FIG. 7.

Figure 14:
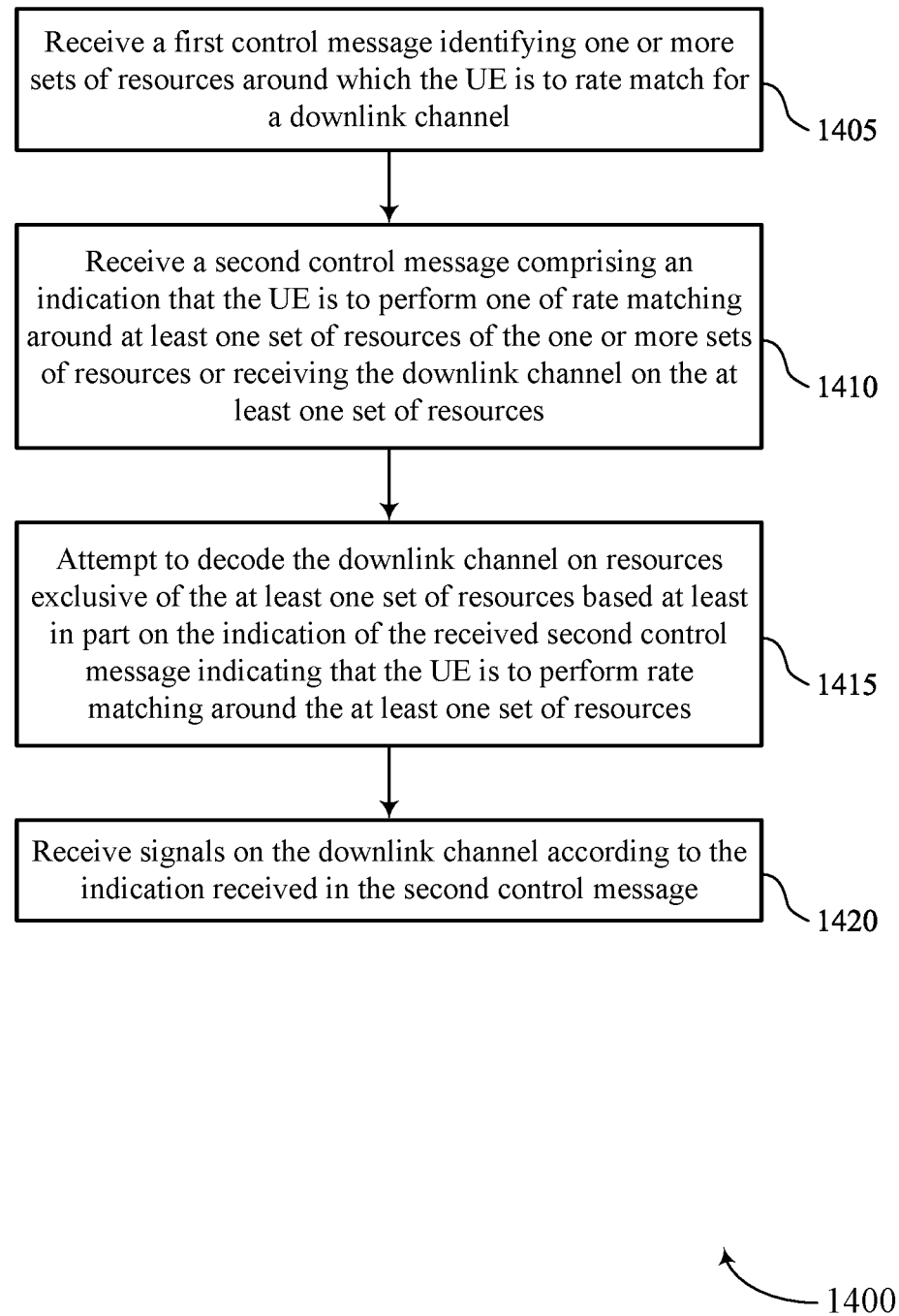

FIG. 14 shows a flowchart illustrating a method 1400 that supports dynamic PDSCH mapping modes in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a first control message identifying one or more sets of resources around which the UE is to rate match for a downlink channel. The operations of 1405 may be performed in accordance with examples as disclosed herein. In some examples, aspects of the operations of 1405 may be performed by a control message receiver 725 as described with reference to FIG. 7.

At 1410, the method may include receiving a second control message including an indication that the UE is to perform one of rate matching around at least one set of resources of the one or more sets of resources or receiving the downlink channel on the at least one set of resources. The operations of 1410 may be performed in accordance with examples as disclosed herein. In some examples, aspects of the operations of 1410 may be performed by a control message receiver 725 as described with reference to FIG. 7.

At 1415, the method may include attempting to decode the downlink channel on resources exclusive of the at least one set of resources based on the indication of the received second control message indicating that the UE is to perform rate matching around the at least one set of resources. The operations of 1415 may be performed in accordance with examples as disclosed herein. In some examples, aspects of the operations of 1415 may be performed by a downlink decoding component 735 as described with reference to FIG. 7.

At 1420, the method may include receiving signals on the downlink channel according to the indication received in the second control message. The operations of 1420 may be performed in accordance with examples as disclosed herein. In some examples, aspects of the operations of 1420 may be performed by a signal receiver 730 as described with reference to FIG. 7.

Figure 15:
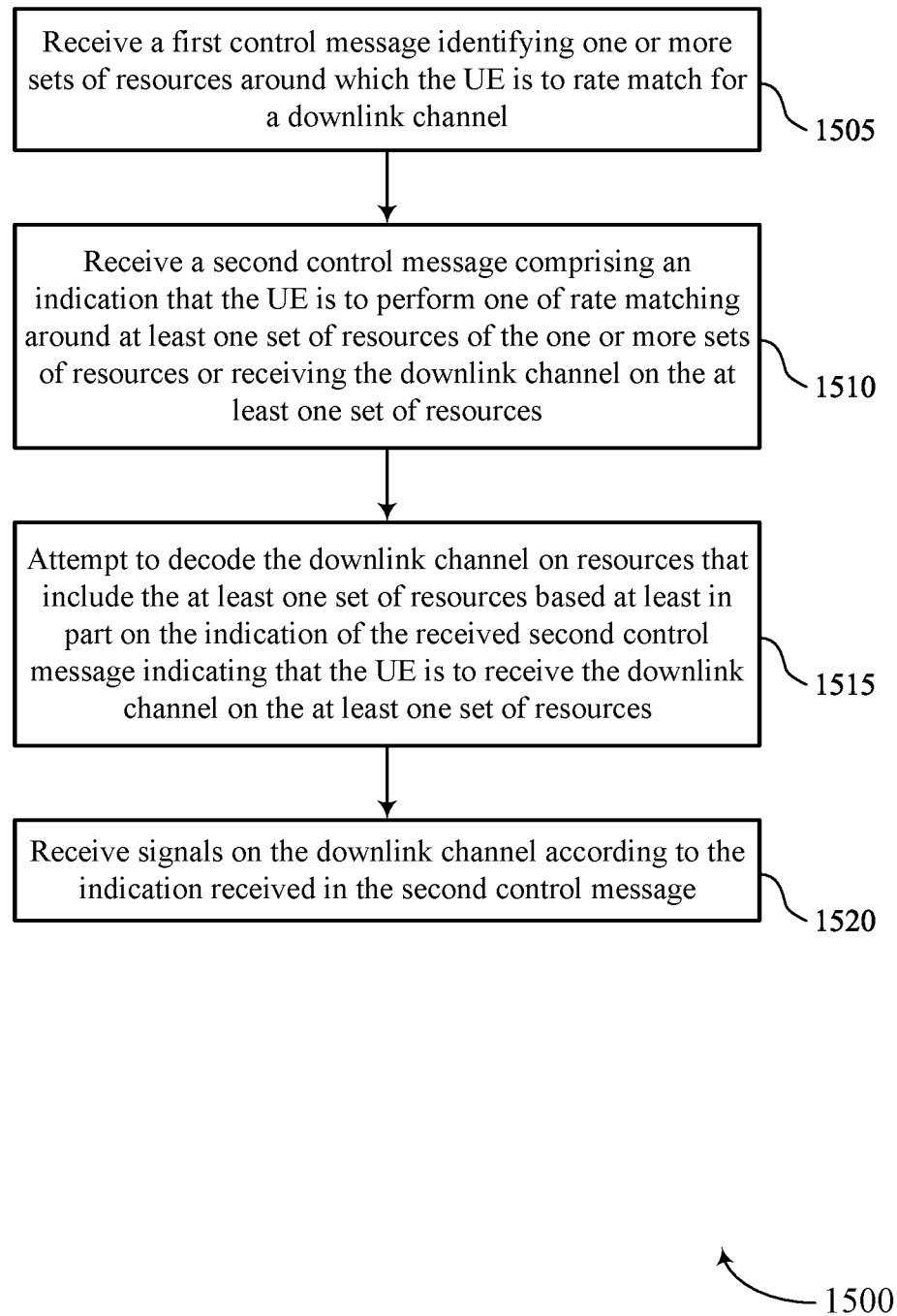

FIG. 15 shows a flowchart illustrating a method 1500 that supports dynamic PDSCH mapping modes in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a first control message identifying one or more sets of resources around which the UE is to rate match for a downlink channel. The operations of 1505 may be performed in accordance with examples as disclosed herein. In some examples, aspects of the operations of 1505 may be performed by a control message receiver 725 as described with reference to FIG. 7.

At 1510, the method may include receiving a second control message including an indication that the UE is to perform one of rate matching around at least one set of resources of the one or more sets of resources or receiving the downlink channel on the at least one set of resources. The operations of 1510 may be performed in accordance with examples as disclosed herein. In some examples, aspects of the operations of 1510 may be performed by a control message receiver 725 as described with reference to FIG. 7.

At 1515, the method may include attempting to decode the downlink channel on resources that include the at least one set of resources based on the indication of the received second control message indicating that the UE is to receive the downlink channel on the at least one set of resources. The operations of 1515 may be performed in accordance with examples as disclosed herein. In some examples, aspects of the operations of 1515 may be performed by a downlink decoding component 735 as described with reference to FIG. 7.

At 1520, the method may include receiving signals on the downlink channel according to the indication received in the second control message. The operations of 1520 may be performed in accordance with examples as disclosed herein. In some examples, aspects of the operations of 1520 may be performed by a signal receiver 730 as described with reference to FIG. 7.

Figure 16:
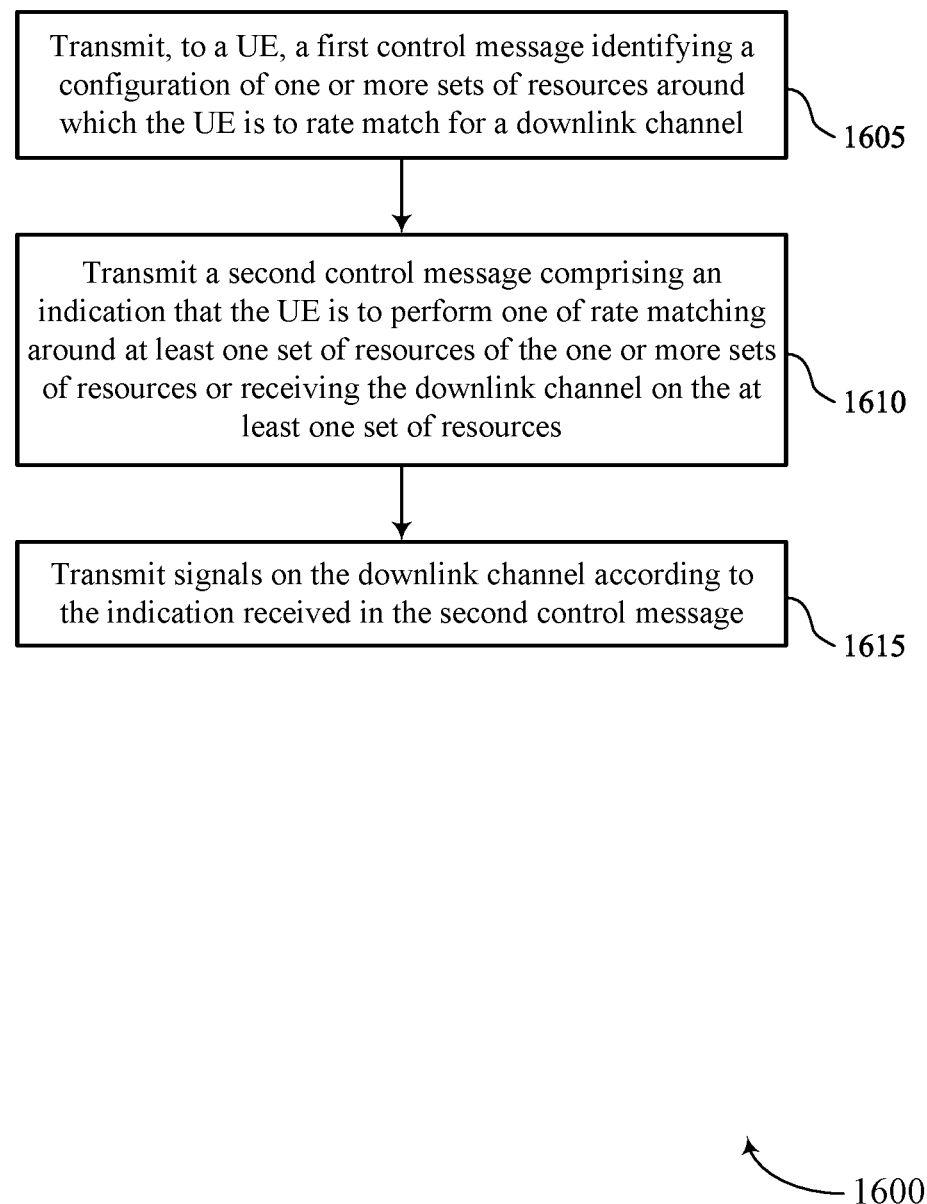

FIG. 16 shows a flowchart illustrating a method 1600 that supports dynamic PDSCH mapping modes in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first control message identifying a configuration of one or more sets of resources around which the UE is to rate match for a downlink channel. The operations of 1605 may be performed in accordance with examples as disclosed herein. In some examples, aspects of the operations of 1605 may be performed by a control message transmitter 1125 as described with reference to FIG. 11.

At 1610, the method may include transmitting a second control message including an indication that the UE is to perform one of rate matching around at least one set of resources of the one or more sets of resources or receiving the downlink channel on the at least one set of resources. The operations of 1610 may be performed in accordance with examples as disclosed herein. In some examples, aspects of the operations of 1610 may be performed by a control message transmitter 1125 as described with reference to FIG. 11.

At 1615, the method may include transmitting signals on the downlink channel according to the indication received in the second control message. The operations of 1615 may be performed in accordance with examples as disclosed herein. In some examples, aspects of the operations of 1615 may be performed by a signal transmitter 1130 as described with reference to FIG. 11.

Figure 17:
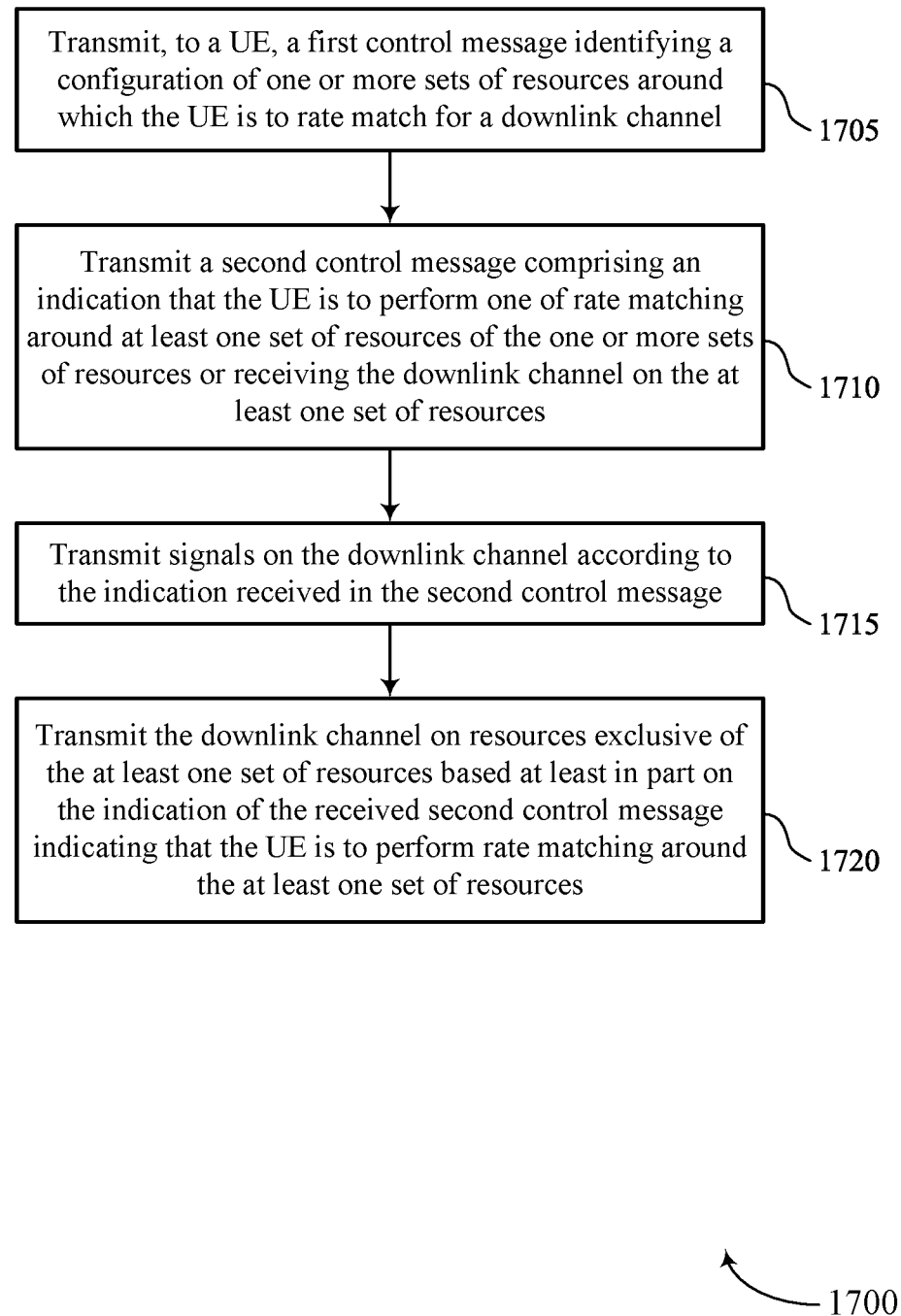

FIG. 17 shows a flowchart illustrating a method 1700 that supports dynamic PDSCH mapping modes in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a first control message identifying a configuration of one or more sets of resources around which the UE is to rate match for a downlink channel. The operations of 1705 may be performed in accordance with examples as disclosed herein. In some examples, aspects of the operations of 1705 may be performed by a control message transmitter 1125 as described with reference to FIG. 11.

At 1710, the method may include transmitting a second control message including an indication that the UE is to perform one of rate matching around at least one set of resources of the one or more sets of resources or receiving the downlink channel on the at least one set of resources. The operations of 1710 may be performed in accordance with examples as disclosed herein. In some examples, aspects of the operations of 1710 may be performed by a control message transmitter 1125 as described with reference to FIG. 11.

At 1715, the method may include transmitting signals on the downlink channel according to the indication received in the second control message. The operations of 1715 may be performed in accordance with examples as disclosed herein. In some examples, aspects of the operations of 1715 may be performed by a signal transmitter 1130 as described with reference to FIG. 11.

At 1720, the method may include transmitting the downlink channel on resources exclusive of the at least one set of resources based on the indication of the received second control message indicating that the UE is to perform rate matching around the at least one set of resources. The operations of 1720 may be performed in accordance with examples as disclosed herein. In some examples, aspects of the operations of 1720 may be performed by a signal transmitter 1130 as described with reference to FIG. 11.

Figure 18:
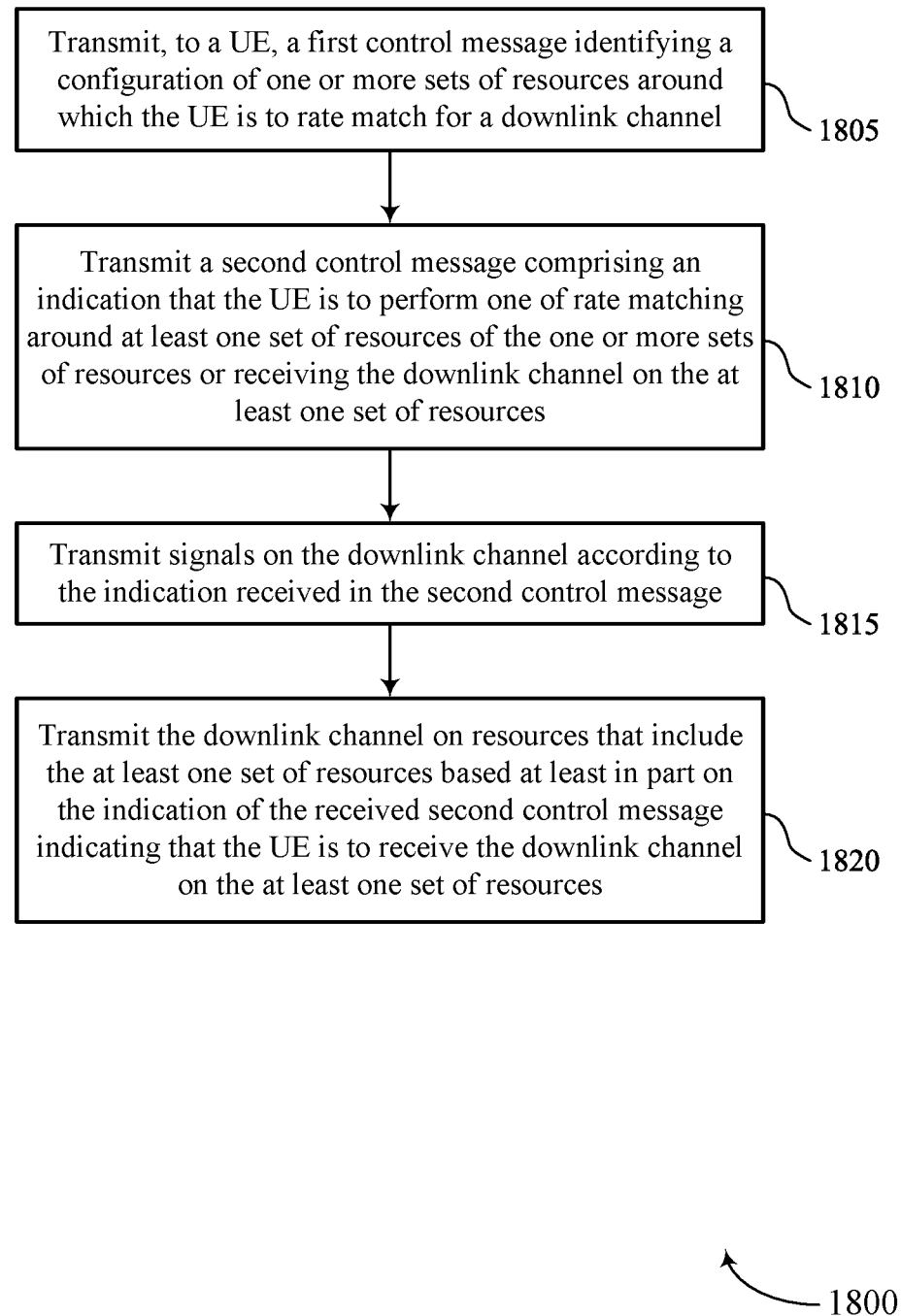

FIG. 18 shows a flowchart illustrating a method 1800 that supports dynamic PDSCH mapping modes in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a first control message identifying a configuration of one or more sets of resources around which the UE is to rate match for a downlink channel. The operations of 1805 may be performed in accordance with examples as disclosed herein. In some examples, aspects of the operations of 1805 may be performed by a control message transmitter 1125 as described with reference to FIG. 11.

At 1810, the method may include transmitting a second control message including an indication that the UE is to perform one of rate matching around at least one set of resources of the one or more sets of resources or receiving the downlink channel on the at least one set of resources. The operations of 1810 may be performed in accordance with examples as disclosed herein. In some examples, aspects of the operations of 1810 may be performed by a control message transmitter 1125 as described with reference to FIG. 11.

At 1815, the method may include transmitting signals on the downlink channel according to the indication received in the second control message. The operations of 1815 may be performed in accordance with examples as disclosed herein. In some examples, aspects of the operations of 1815 may be performed by a signal transmitter 1130 as described with reference to FIG. 11.

At 1820, the method may include transmitting the downlink channel on resources that include the at least one set of resources based on the indication of the received second control message indicating that the UE is to receive the downlink channel on the at least one set of resources. The operations of 1820 may be performed in accordance with examples as disclosed herein. In some examples, aspects of the operations of 1820 may be performed by a signal transmitter 1130 as described with reference to FIG. 11.

The following provides an overview of aspects of the present disclosure:

Aspect 1: A method for wireless communication at a UE, comprising: receiving a first control message identifying one or more sets of resources around which the UE is to rate match for a downlink channel; receiving a second control message comprising an indication that the UE is to perform one of rate matching around at least one set of resources of the one or more sets of resources or receiving the downlink channel on the at least one set of resources; and receiving signals on the downlink channel according to the indication received in the second control message.

Aspect 2: The method of aspect 1, wherein receiving the signals on the downlink channel further comprises: attempting to decode the downlink channel on resources exclusive of the at least one set of resources based at least in part on the indication of the received second control message indicating that the UE is to perform rate matching around the at least one set of resources.

Aspect 3: The method of aspect 1, wherein receiving the signals on the downlink channel further comprises: attempting to decode the downlink channel on resources that include the at least one set of resources based at least in part on the indication of the received second control message indicating that the UE is to receive the downlink channel on the at least one set of resources.

Aspect 4: The method of any of aspects 1 through 3, wherein the indication comprises a first indication, the method further comprising: receiving, in the second control message, a second indication that the UE is to perform a different one of rate matching around at least one second set of resources of the one or more sets of resources or receiving the downlink channel on the at least one second set of resources.

Aspect 5: The method of aspect 4, wherein the indication identifies that the UE is to perform rate matching around the at least one set of resources of the one or more sets of resources based at least in part on the at least one set of resources being transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

Aspect 6: The method of any of aspects 4 through 5, wherein the indication identifies that the UE is to perform rate matching around the at least one set of resources of the one or more sets of resources based at least in part on the at least one set of resources having a same QCL relationship with a first SSB transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

Aspect 7: The method of any of aspects 1 through 6, wherein the one or more sets of resources comprise a plurality of sets of resources, and receiving the second control message comprises: receiving a plurality of bits in the second control message, wherein each bit of the plurality of bits corresponds to one set of resources of the plurality of sets of resources, and each bit indicates that the UE is perform one of rate matching around the one set of resources or receiving the downlink channel on the one set of resources.

Aspect 8: The method of any of aspects 1 through 6, wherein the one or more sets of resources comprise a plurality of sets of resources, and receiving the second control message comprises: receiving a single bit in the second control message, wherein the single bit indicates that the UE is perform one of rate matching around the plurality of sets of resources or receiving the downlink channel on the plurality of sets of resources.

Aspect 9: The method of any of aspects 1 through 8, wherein receiving a second control message further comprises: receiving, in the second control message, a grant of resources for the downlink channel, the signals received on the downlink channel based at least in part on both the grant of resources and the indication received in the second control message.

Aspect 10: The method of any of aspects 1 through 9, wherein the one or more sets of resources comprise a set of resources for a CSI-RS, a CRS, a CORESET, an SSB, a PBCH, an SIB, a TRS, a PRS, or any combination thereof.

Aspect 11: The method of aspect 10, wherein the CSI-RS comprises a P-CSI-RS, a CORESET, an A-CSI-RS, a CSI-RS for mobility, a CSI-RS for interference management, or any combination thereof.

Aspect 12: The method of any of aspects 1 through 11, wherein receiving the first control message identifying the one or more sets of resources comprises: receiving, from a base station, a message indicating one or more signals transmitted by the base station to a second device; and determining whether to measure the one or more signals or defer from measuring the one or more signals based at least in part on being configured to rate match.

Aspect 13: The method of aspect 12, wherein the determination is based at least in part on an indication received from the base station, determined by the UE, or a combination thereof.

Aspect 14: A method for wireless communication at a base station, comprising: transmitting, to a UE, a first control message identifying a configuration of one or more sets of resources around which the UE is to rate match for a downlink channel; transmitting a second control message comprising an indication that the UE is to perform one of rate matching around at least one set of resources of the one or more sets of resources or receiving the downlink channel on the at least one set of resources; and transmitting signals on the downlink channel according to the indication received in the second control message.

Aspect 15: The method of aspect 14, wherein transmitting the signals on the downlink channel further comprises: transmitting the downlink channel on resources exclusive of the at least one set of resources based at least in part on the indication of the received second control message indicating that the UE is to perform rate matching around the at least one set of resources.

Aspect 16: The method of aspect 14, wherein transmitting the signals on the downlink channel further comprises: transmitting the downlink channel on resources that include the at least one set of resources based at least in part on the indication of the received second control message indicating that the UE is to receive the downlink channel on the at least one set of resources.

Aspect 17: The method of any of aspects 14 through 16, wherein the indication comprises a first indication, the method further comprising: transmitting, in the second control message, a second indication that the UE is to perform a different one of rate matching around at least one second set of resources of the one or more sets of resources or receiving the downlink channel on the at least one second set of resources.

Aspect 18: The method of aspect 17, wherein the indication identifies that the UE is to perform rate matching around the at least one set of resources of the one or more sets of resources based at least in part on the at least one set of resources being transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

Aspect 19: The method of any of aspects 17 through 18, wherein the indication identifies that the UE is to perform rate matching around the at least one set of resources of the one or more sets of resources based at least in part on the at least one set of resources having a same QCL relationship with a first SSB transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

Aspect 20: The method of any of aspects 14 through 19, wherein the one or more sets of resources comprise a plurality of sets of resources, and transmitting the second control message comprises: transmitting a plurality of bits in the second control message, wherein each bit of the plurality of bits corresponds to one set of resources of the plurality of sets of resources, and each bit indicates that the UE is perform one of rate matching around the one set of resources or receiving the downlink channel on the one set of resources.

Aspect 21: The method of any of aspects 14 through 19, wherein the one or more sets of resources comprise a plurality of sets of resources, and transmitting the second control message comprises: transmitting a single bit in the second control message, wherein the single bit indicates that the UE is perform one of rate matching around the plurality of sets of resources or receiving the downlink channel on the plurality of sets of resources.

Aspect 22: The method of any of aspects 14 through 21, wherein transmitting a second control message further comprises: transmitting, in the second control message, a grant of resources for the downlink channel, the signals received on the downlink channel based at least in part on both the grant of resources and the indication received in the second control message.

Aspect 23: The method of any of aspects 14 through 22, wherein the one or more sets of resources comprise a set of resources for a CSI-RS, a CRS, a CORESET, an SSB, a PBCH, an SIB, a TRS, a PRS, or any combination thereof.

Aspect 24: The method of aspect 23, wherein the CSI-RS comprises a P-CSI-RS, an A-CSI-RS, a CSI-RS for mobility, a CSI-RS for interference management, or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a first control message identifying one or more sets of resources around which the UE is to rate match for a downlink channel;
receiving a second control message comprising a grant of resources for the downlink channel and an indication that the UE is to perform one of rate matching around at least one set of resources of the one or more sets of resources indicated via the first control message or receiving the downlink channel on the at least one set of resources of the one or more sets of resources indicated via the first control message, the resources indicated via the grant at least partially overlapping with the one or more sets of resources indicated via the first control message; and
receiving, via the resources indicated via the grant, signals on the downlink channel according to both the grant of the resources for the downlink channel and the indication received in the second control message.

2. The method of claim 1, wherein receiving the signals on the downlink channel further comprises:
attempting to decode the downlink channel on the resources exclusive of the at least one set of resources based at least in part on the indication of the received second control message indicating that the UE is to perform rate matching around the at least one set of resources.

3. The method of claim 1, wherein receiving the signals on the downlink channel further comprises:
attempting to decode the downlink channel on the resources that include the at least one set of resources based at least in part on the indication of the received second control message indicating that the UE is to receive the downlink channel on the at least one set of resources.

4. The method of claim 1, wherein the indication comprises a first indication, the method further comprising:
receiving, in the second control message, a second indication that the UE is to perform a different one of rate matching around at least one second set of resources of the one or more sets of resources or receiving the downlink channel on the at least one second set of resources.

5. The method of claim 4, wherein:
the indication identifies that the UE is to perform rate matching around the at least one set of resources of the one or more sets of resources based at least in part on the at least one set of resources being transmitted on resources spatially related to the downlink channel; and
the second indication identifies that the UE is to perform receiving the downlink channel on the at least one set of resources based at least in part on the at least one second set of resources being transmitted on resources spatially separate from the downlink channel.

6. The method of claim 4, wherein:
the indication identifies that the UE is to perform rate matching around the at least one set of resources of the one or more sets of resources based at least in part on the at least one set of resources having a same quasi-co-location relationship with a first synchronization signal block transmitted on resources spatially related to the downlink channel; and
the second indication identifies that the UE is to perform receiving the downlink channel on the at least one set of resources based at least in part on the at least one second set of resources being transmitted on resources spatially separate from the downlink channel.

7. The method of claim 1, wherein the one or more sets of resources comprise a plurality of sets of resources, and receiving the second control message comprises:
receiving a plurality of bits in the second control message, wherein each bit of the plurality of bits corresponds to one set of resources of the plurality of sets of resources, and each bit indicates that the UE is to perform one of rate matching around the one set of resources or receiving the downlink channel on the one set of resources.

8. The method of claim 1, wherein the one or more sets of resources comprise a plurality of sets of resources, and receiving the second control message comprises:
receiving a single bit in the second control message, wherein the single bit indicates that the UE is to perform one of rate matching around the plurality of sets of resources or receiving the downlink channel on the plurality of sets of resources.

9. The method of claim 1, wherein the one or more sets of resources comprise a set of resources for a channel state information reference signal, a cell specific reference signal, a control resource set, a synchronization signal block, a physical broadcast channel, a system information block, a tracking reference signal, a positioning reference signal, or any combination thereof.

10. The method of claim 9, wherein the channel state information reference signal comprises a periodic channel state information reference signal, a control resource set, an aperiodic channel state information reference signal, a channel state information reference signal for mobility, a channel state information reference signal for interference management, or any combination thereof.

11. The method of claim 1, wherein receiving the first control message identifying the one or more sets of resources comprises:
receiving, from a base station, a message indicating one or more signals transmitted by the base station to a second device; and
determining whether to measure the one or more signals or defer from measuring the one or more signals based at least in part on being configured to rate match.

12. The method of claim 11, wherein the determination is based at least in part on an indication received from the base station, determined by the UE, or a combination thereof.

13. A method for wireless communication at a network entity, comprising:
transmitting a first control message identifying a configuration of one or more sets of resources around which a user equipment (UE) is to rate match for a downlink channel;
transmitting a second control message comprising a grant of resources for the downlink channel an indication that the UE is to perform one of rate matching around at least one set of resources of the one or more sets of resources indicated via the first control message or receiving the downlink channel on the at least one set of resources of the one or more sets of resources indicated via the first control message, the resources indicated via the grant at least partially overlapping with the one or more sets of resources indicated via the first control message; and transmitting, via the resources indicated via the grant, signals on the downlink channel according to both the grant of the resources for the downlink channel and the indication received in the second control message.

14. The method of claim 13, wherein transmitting the signals on the downlink channel further comprises:

transmitting the downlink channel on the resources exclusive of the at least one set of resources based at least in part on the indication of the received second control message indicating that the UE is to perform rate matching around the at least one set of resources.

15. The method of claim 13, wherein transmitting the signals on the downlink channel further comprises:

transmitting the downlink channel on the resources that include the at least one set of resources based at least in part on the indication of the received second control message indicating that the UE is to receive the downlink channel on the at least one set of resources.

16. The method of claim 13, wherein the indication comprises a first indication, the method further comprising:

transmitting, in the second control message, a second indication that the UE is to perform a different one of rate matching around at least one second set of resources of the one or more sets of resources or receiving the downlink channel on the at least one second set of resources.

17. The method of claim 16, wherein:

the indication identifies that the UE is to perform rate matching around the at least one set of resources of the one or more sets of resources based at least in part on the at least one set of resources being transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

18. The method of claim 16, wherein:

the indication identifies that the UE is to perform rate matching around the at least one set of resources of the one or more sets of resources based at least in part on the at least one set of resources having a same quasi-co-location relationship with a first synchronization signal block transmitted on resources spatially related to the downlink channel; and the second indication identifies that the UE is to perform receiving the downlink channel on the at least one set of resources based at least in part on the at least one second set of resources being transmitted on resources spatially separate from the downlink channel.

19. The method of claim 13, wherein the one or more sets of resources comprise a plurality of sets of resources, and transmitting the second control message comprises:

transmitting a plurality of bits in the second control message, wherein each bit of the plurality of bits corresponds to one set of resources of the plurality of sets of resources, and each bit indicates that the UE is to perform one of rate matching around the one set of resources or receiving the downlink channel on the one set of resources.

20. The method of claim 13, wherein the one or more sets of resources comprise a plurality of sets of resources, and transmitting the second control message comprises:

transmitting a single bit in the second control message, wherein the single bit indicates that the UE is to perform one of rate matching around the plurality of sets of resources or receiving the downlink channel on the plurality of sets of resources.

21. The method of claim 13, wherein the one or more sets of resources comprise a set of resources for a channel state information reference signal, a cell specific reference signal, a control resource set, a synchronization signal block, a physical broadcast channel, a system information block, a tracking reference signal, a positioning reference signal, or any combination thereof.

22. The method of claim 21, wherein the channel state information reference signal comprises a periodic channel state information reference signal, an aperiodic channel state information reference signal, a channel state information reference signal for mobility, a channel state information reference signal for interference management, or any combination thereof.

23. An apparatus for wireless communication at a user equipment (UE), comprising:

a processor;

memory coupled with the processor; and instructions stored in the memory and executable by the processor to cause the apparatus to:

receive a first control message identifying one or more sets of resources around which the UE is to rate match for a downlink channel;

receive a second control message comprising a grant of resources for the downlink channel and an indication that the UE is to perform one of rate matching around at least one set of resources of the one or more sets of resources indicated via the first control message or receiving the downlink channel on the at least one set of resources of the one or more sets of resources indicated via the first control message, the resources indicated via the grant at least partially overlapping with the one or more sets of resources indicated via the first control message; and receive, via the resources indicated via the grant, signals on the downlink channel according to both the grant of the resources for the downlink channel and the indication received in the second control message.

24. The apparatus of claim 23, wherein the instructions to receive the signals on the downlink channel are further executable by the processor to cause the apparatus to:

attempt to decode the downlink channel on the resources exclusive of the at least one set of resources based at least in part on the indication of the received second control message indicating that the UE is to perform rate matching around the at least one set of resources.

25. The apparatus of claim 23, wherein the instructions to receive the signals on the downlink channel are further executable by the processor to cause the apparatus to:

attempt to decode the downlink channel on the resources that include the at least one set of resources based at least in part on the indication of the received second control message indicating that the UE is to receive the downlink channel on the at least one set of resources.

26. The apparatus of claim 23, wherein the indication comprises a first indication, and the instructions are further executable by the processor to cause the apparatus to:

receive, in the second control message, a second indication that the UE is to perform a different one of rate matching around at least one second set of resources of the one or more sets of resources or receiving the downlink channel on the at least one second set of resources.

27. An apparatus for wireless communication at a network entity, comprising:
a processor;
memory coupled with the processor; and
instructions stored in the memory and executable by the processor to cause the apparatus to:
transmit a first control message identifying a configuration of one or more sets of resources around which a user equipment (UE) is to rate match for a downlink channel;
transmit a second control message comprising a grant of resources for the downlink channel and an indication that the UE is to perform one of rate matching around at least one set of resources of the one or more sets of resources indicated via the first control message or receiving the downlink channel on the at least one set of resources of the one or more sets of resources indicated via the first control message, the resources indicated via the grant at least partially overlapping with the one or more sets of resources indicated via the first control message; and
transmit, via the resources indicated via the grant, signals on the downlink channel according to both the grant of the resources for the downlink channel and the indication received in the second control message.

28. The apparatus of claim 27, wherein the instructions to transmit the signals on the downlink channel are further executable by the processor to cause the apparatus to:
transmit the downlink channel on the resources exclusive of the at least one set of resources based at least in part on the indication of the received second control message indicating that the UE is to perform rate matching around the at least one set of resources.

* * * * *